(12) United States Patent
Takahashi

(10) Patent No.: US 11,400,917 B2
(45) Date of Patent: Aug. 2, 2022

(54) POWER SUPPLY SYSTEM FOR VEHICLE

(71) Applicant: Honda Motor Co., Ltd., Tokyo (JP)

(72) Inventor: Masaya Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 114 days.

(21) Appl. No.: 16/856,046

(22) Filed: Apr. 23, 2020

(65) Prior Publication Data

US 2020/0339103 A1    Oct. 29, 2020

(30) Foreign Application Priority Data

Apr. 24, 2019  (JP) .............................. JP2019-083113

(51) Int. Cl.
*B60W 20/15* (2016.01)
*B60W 20/50* (2016.01)
*B60W 10/26* (2006.01)

(52) U.S. Cl.
CPC ............ *B60W 20/15* (2016.01); *B60W 20/50* (2013.01); *B60W 10/26* (2013.01); *B60W 2510/244* (2013.01)

(58) Field of Classification Search
None
See application file for complete search history.

(56) References Cited

U.S. PATENT DOCUMENTS

| | | | |
|---|---|---|---|
| 2012/0055727 A1* | 3/2012 | Omiya .................. | B60W 10/26 180/279 |
| 2014/0191693 A1* | 7/2014 | Funaba .................... | H02P 27/06 318/139 |
| 2019/0173390 A1* | 6/2019 | Takegawa ............ | H02M 7/4837 |

FOREIGN PATENT DOCUMENTS

| | | |
|---|---|---|
| JP | 2013146130 | 7/2013 |
| JP | 2012164680 | 7/2014 |
| JP | 2016104318 | 7/2017 |
| JP | 2018042308 | 3/2018 |
| WO | 2010131340 | 11/2010 |

OTHER PUBLICATIONS

Office Action of Japan Counterpart Application, with English translation thereof, dated Apr. 12, 2022, pp. 1-6.

* cited by examiner

*Primary Examiner* — Todd Melton
*Assistant Examiner* — Jason R Roberson
(74) *Attorney, Agent, or Firm* — JCIPRNET

(57) ABSTRACT

Provided is a power supply system for a vehicle, which can reduce a voltage of a main circuit to a specified voltage or less within a specified time after a vehicle collision. The power supply system for the vehicle includes: a high voltage battery, a driving motor connected to a driving wheel, a high voltage circuit transferring electric power between the high voltage battery and the driving motor, a secondary side voltage sensor acquiring a secondary side voltage which is a voltage in the high voltage circuit, and a system ECU executing discharge control for operating the high voltage circuit and reducing the secondary side voltage when a discharge start condition is established. After the discharge start condition is established, the system ECU starts a discharge control process after executing a standby control process for standing by for the start of the discharge control process for a predetermined time.

8 Claims, 14 Drawing Sheets

POWER SUPPLY SYSTEM FOR VEHICLE

CROSS-REFERENCE TO RELATED APPLICATION

This application claims the priority benefit of Japan Application No. 2019-083113, filed on Apr. 24, 2019. The entirety of the above-mentioned patent application is hereby incorporated by reference herein and made a part of this specification.

BACKGROUND

Technical Field

The disclosure relates to a power supply system for a vehicle. More specifically, the disclosure relates to a power supply system for a vehicle, provided with a discharge function for discharging charges in a main circuit that connects a power storage device and an electric motor at the time of a vehicle collision.

Description of Related Art

An electric vehicle such as a hybrid car or an electric car is equipped with a power supply system and runs by using the electric power supplied from the power supply system to drive a motor. The power supply system includes a high voltage battery, a DC-DC converter for converting an output voltage of the high voltage battery, and an inverter for converting a DC (direct current) output of the DC-DC converter into AC (alternating current) and supplying it to the motor. Further, a plurality of large-capacity smoothing capacitors are provided in the main circuit constituted by these DC-DC converter, inverter, etc.

In order to stabilize the DC power of the power supply system while the vehicle is running, it is necessary to accumulate charges in the plurality of smoothing capacitors. However, when the vehicle collides, for example, the charges accumulated in these smoothing capacitors need to be discharged quickly. Therefore, in many vehicles, discharge control is executed to discharge the charges accumulated in the smoothing capacitors to some load to quickly reduce the voltage of the main circuit in the event of a collision (for example, refer to Patent Document 1).

RELATED ART

Patent Document

[Patent Document 1] International Publication No. 2010/131340

When a vehicle collision occurs, it is preferable to reduce the voltage of the main circuit as quickly as possible. However, if the vehicle collides on a slope or if the vehicle collides obliquely, even after discharge control is executed in response to detection of the vehicle collision to reduce the voltage of the main circuit, the driving wheels may still rotate and generate induced power to the motor, and the voltage of the main circuit may rise again. The invention of Patent Document 1 does not have a thorough study about the re-rise of the voltage after discharge control is executed. For this reason, the voltage in the main circuit may not be reduced to a specified voltage or less within a specified time after a vehicle collision.

The disclosure provides a power supply system for a vehicle, which can reduce the voltage of the main circuit to a specified voltage or less within a specified time after the vehicle collides even if the voltage of the main circuit rises again before the vehicle stops.

SUMMARY

A power supply system (for example, the power supply system 1 to be described later) for a vehicle (for example, the vehicle V to be described later) according to the disclosure includes: a power storage device (for example, the high voltage battery 21 to be described later); an electric motor (for example, the driving motor M to be described later) connected to a driving wheel (for example, the driving wheel W to be described later) of the vehicle; a main circuit (for example, the high voltage circuit 2 to be described later) transferring electric power between the power storage device and the electric motor; a voltage acquisition part (for example, the secondary side voltage sensor 94 to be described later) acquiring a main circuit voltage which is a voltage in the main circuit; and a control device (for example, the system ECU 8 to be described later) executing discharge control for operating the main circuit and reducing the main circuit voltage when a discharge start condition is established, wherein after the discharge start condition is established, the control device starts the discharge control after executing standby control for standing by for start of the discharge control for a predetermined time.

DESCRIPTION OF THE EMBODIMENTS

First Embodiment

Figure 1A:
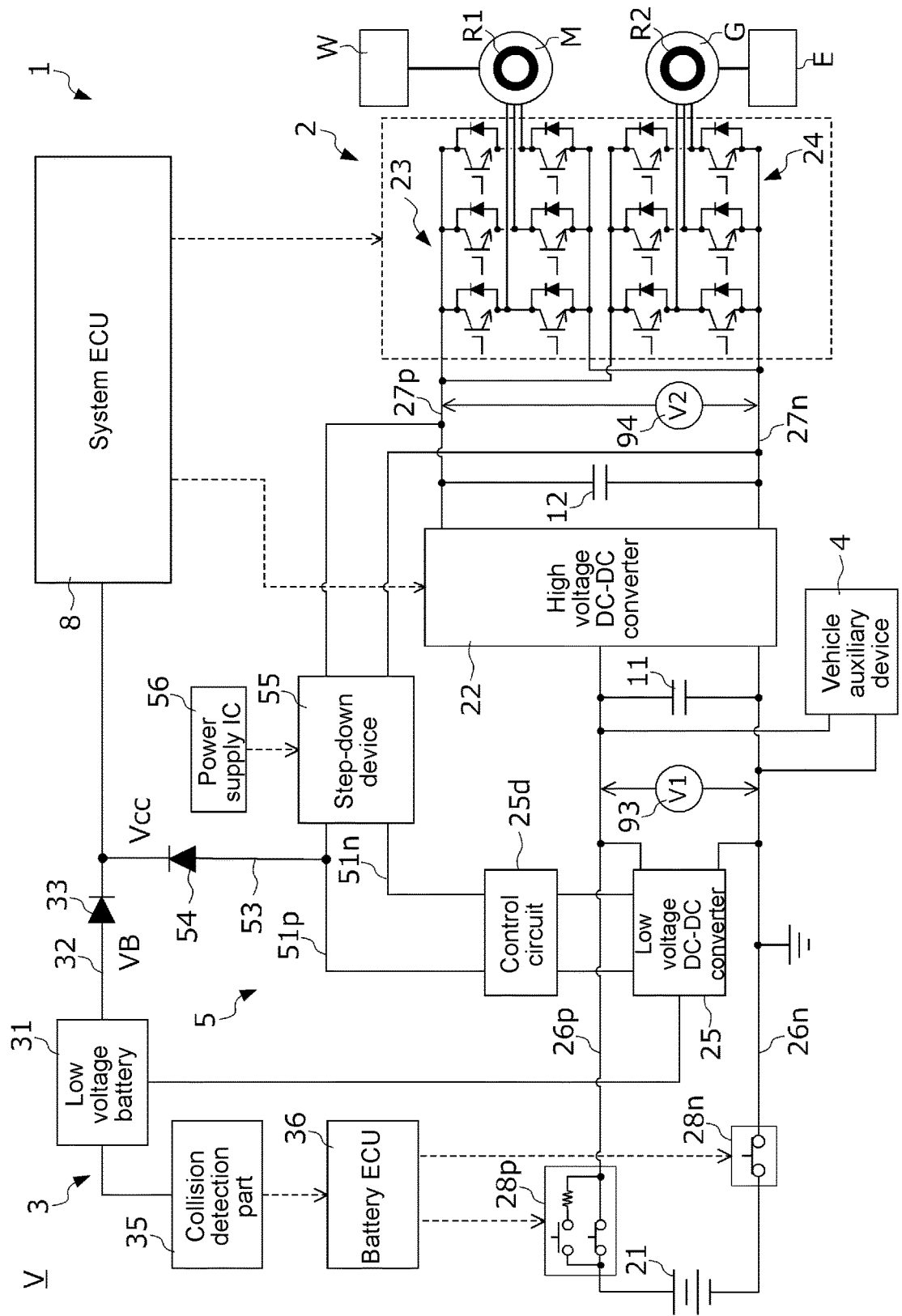
FIG. 1A is a diagram showing a configuration of the electric vehicle equipped with the power supply system according to the first embodiment of the disclosure.

Hereinafter, the first embodiment of the disclosure will be described with reference to the drawings. FIG. 1A is a diagram showing a configuration of an electric vehicle V (hereinafter simply referred to as "vehicle") equipped with a power supply system 1 according to the present embodiment. In the present embodiment, a so-called hybrid vehicle including an engine E, a driving motor M, and a generator G is described as an example of the vehicle V. However, the disclosure is not limited thereto. The power supply system according to the disclosure is not necessarily used on a hybrid vehicle and can be applied to any vehicle such as an electric car or a fuel cell car if the vehicle runs using electric power stored in a battery.

The vehicle V includes the power supply system 1, the engine E, the driving motor M which is a motor generator, the generator G, and driving wheels W. The driving motor M mainly generates power for the vehicle V to run. An output shaft of the driving motor M is connected to the driving wheels W via a power transmission mechanism (not shown). A torque generated by the driving motor M by supplying electric power from the power supply system 1 to the driving motor M is transmitted to the driving wheels W via the power transmission mechanism (not shown) to rotate the driving wheels W for the vehicle V to run. In addition, the driving motor M functions as a generator during decelerating regeneration of the vehicle V. The electric power generated by the driving motor M is charged to a high voltage battery 21 (to be described later) included in the power supply system 1.

A first resolver R1 is attached to the output shaft of the driving motor M for detecting a rotation angle of the output shaft. The first resolver R1 is excited when AC power is supplied from a system ECU 8 of the power supply system 1, and transmits a signal corresponding to the rotation angle of the output shaft of the driving motor M to the system ECU 8.

A crankshaft which is an output shaft of the engine E is connected to the generator G via a power transmission mechanism (not shown). The generator G is driven by the power of the engine E and generates electric power. The electric power generated by the generator G is charged to the high voltage battery 21. The engine E may be connected to the driving wheels W via a power transmission mechanism (not shown), and the driving wheels W may be driven using the power of the engine E.

A second resolver R2 is attached to the output shaft of the generator G for detecting a rotation angle of the output shaft. The second resolver R2 is excited when AC power is supplied from the system ECU 8 of the power supply system 1, and transmits a signal corresponding to the rotation angle of the output shaft of the generator G to the system ECU 8.

The power supply system 1 includes a high voltage circuit 2 which connects the high voltage battery 21 with the driving motor M and the generator G and transfers electric power between the high voltage battery 21 and the driving motor M and the generator G, a low voltage circuit 3 provided with a low voltage battery 31, a backup power supply unit 5, and the system ECU 8 which controls the driving motor M, the generator G, the high voltage circuit 2, the low voltage circuit 3, the backup power supply unit 5, etc.

The high voltage circuit 2 includes the high voltage battery 21, a high voltage DC-DC converter 22 serving as a voltage converter, first power lines 26p and 26n connecting the positive and negative electrodes of the high voltage battery 21 and the positive and negative terminals on the low voltage side of the high voltage DC-DC converter 22, a first inverter 23 serving as a power converter, a second inverter 24, second power lines 27p and 27n connecting the positive and negative terminals on the high voltage side of the high voltage DC-DC converter 22 and the DC input/output sides of the inverters 23 and 24, a low voltage DC-DC converter 25 connected to the first power lines 26p and 26n, a control circuit 25d thereof, a primary side capacitor 11 connected to the first power lines 26p and 26n, a secondary side capacitor 12 connected to the second power lines 27p and 27n, and a vehicle auxiliary device 4 connected to the first power lines 26p and 26n. In FIG. 1A, a combination of a plurality of capacitors connected in parallel to each other in the first power lines 26p and 26n is illustrated as the primary side capacitor 11, and a combination of a plurality of capacitors connected in parallel to each other in the second power lines 27p and 27n is illustrated as the secondary side capacitor 12. In the following description, the capacitance of the primary side capacitor 11 is C1 and the capacitance of the secondary side capacitor 12 is C2.

The high voltage battery 21 is a secondary battery capable of discharging for converting chemical energy into electric energy as well as charging for converting electric energy into chemical energy. The following describes a case where a so-called lithium ion storage battery that performs charging/discharging by moving lithium ions between the electrodes is used as the high voltage battery 21, but the disclosure is not limited thereto.

The first power lines 26p and 26n are provided with a positive contactor 28p and a negative contactor 28n respectively. These contactors 28p and 28n are the normal open type, which is opened when no external command signal is input to disconnect two electrodes of the high voltage battery 21 from the first power lines 26p and 26n, and is closed when a command signal is input to connect the high voltage battery 21 and the first power lines 26p and 26n. These contactors 28p and 28n open and close using the electric power supplied from the low voltage battery 31 in response to the command signal transmitted from the battery ECU 6. The positive contactor 28p is a precharge contactor having a precharge resistor for alleviating inrush current to the plurality of capacitors 11 and 12 provided in the high voltage circuit 2.

The vehicle auxiliary device 4 is configured by electric loads such as an electric air compressor that adjusts the temperature of the vehicle interior (not shown) and a battery heater that heats the high voltage battery 21, for example.

Figure 1B:
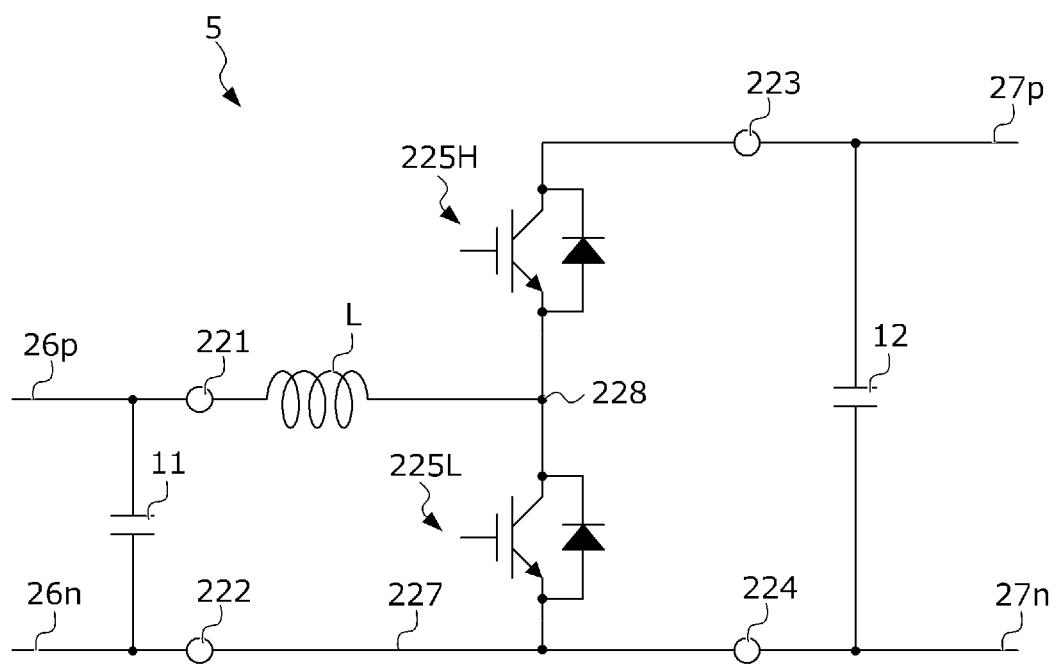
FIG. 1B is a diagram showing an example of a circuit configuration of the high voltage DC-DC converter.

FIG. 1B is a diagram showing an example of a circuit configuration of the high voltage DC-DC converter 22. The high voltage DC-DC converter 22 is provided between the first power lines 26p and 26n and the second power lines 27p and 27n. The low voltage side positive terminal 221 and the low voltage side negative terminal 222 of the high voltage DC-DC converter 22 are respectively connected to two ends of the primary side capacitor 11. The high voltage side positive terminal 223 and the high voltage side negative terminal 224 of the high voltage DC-DC converter 22 are respectively connected to two ends of the secondary side capacitor 12.

The high voltage DC-DC converter 22 is a bidirectional DC-DC converter configured by combining a reactor L, a high arm element 225H, a low arm element 225L, and a negative bus 227.

The negative bus 227 is a wiring that connects the low voltage side negative terminal 222 and the high voltage side negative terminal 224. The reactor L is connected to the low voltage side positive terminal 221 on one end side and connected to a connection node 228 between the high arm element 225H and the low arm element 225L on the other end side.

The high arm element 225H includes a known power switching element such as an IGBT or a MOSFET, and a diode connected in parallel to the power switching element. The low arm element 225L includes a known power switching element such as an IGBT or a MOSFET, and a diode connected in parallel to the power switching element. The high arm element 225H and the low arm element 225L are connected in series in this order between the high voltage side positive terminal 223 and the negative bus 227.

The collector of the power switching element of the high arm element 225H is connected to the high voltage side positive terminal 223, and the emitter thereof is connected to the collector of the low arm element 225L. The emitter of the power switching element of the low arm element 225L is connected to the negative bus 227. The forward direction of the diode provided in the high arm element 225H is a direction from the reactor L toward the high voltage side positive terminal 223. In addition, the forward direction of the diode provided in the low arm element 225L is a direction from the negative bus 227 toward the reactor L.

The high arm element 225H and the low arm element 225L are respectively turned on or off by a gate drive signal generated by a gate drive circuit (not shown) provided in the system ECU 8.

The high voltage DC-DC converter 22 drives the elements 225H and 225L on/off in accordance with a gate drive signal generated at a predetermined timing from the gate drive circuit of the system ECU 8 so as to perform a step-up function and a step-down function. The step-up function refers to a function of boosting the voltage applied to the terminals 221 and 222 on the low voltage side and outputting it to the terminals 223 and 224 on the high voltage side, by which the current flows from the first power lines 26p and 26n to the second power lines 27p and 27n. The step-down function refers to a function of stepping down the voltage applied to the terminals 223 and 224 on the high voltage side and outputting it to the terminals 221 and 222 on the low voltage side, by which the current flows from the second power lines 27p and 27n to the first power lines 26p and 26n. Hereinafter, the potential difference between the first power lines 26p and 26n, more specifically, the voltage across two ends of the primary side capacitor 11 is referred to as a primary side voltage V1. Besides, the potential difference between the second power lines 27p and 27n, more specifically, the voltage across two ends of the secondary side capacitor 12 is referred to as a secondary side voltage V2.

Returning to FIG. 1A, the first inverter 23 and the second inverter 24 are, for example, PWM inverters based on pulse width modulation, each including a bridge circuit configured by bridge-connecting a plurality of switching elements (for example, IGBT), and have a function of converting DC power and AC power. The first inverter 23 is connected to the second power lines 27p and 27n on the DC input/output side thereof, and is connected to the U-phase, V-phase, and W-phase coils of the driving motor M on the AC input/output side. The second inverter 24 is connected to the second power lines 27p and 27n on the DC input/output side thereof, and is connected to the U-phase, V-phase, and W-phase coils of the generator G on the AC input/output side.

The first inverter 23 is configured by bridge-connecting a high-side U-phase switching element and a low-side U-phase switching element connected to the U phase of the driving motor M, a high-side V-phase switching element and a low-side V-phase switching element connected to the V phase of the driving motor M, and a high-side W-phase switching element and a low-side W-phase switching element connected to the W phase of the driving motor M for each phase.

The first inverter 23 drives the switching elements of each phase described above on/off in accordance with a gate drive signal generated at a predetermined timing from the gate drive circuit of the system ECU 8 so as to convert the DC power supplied from the high voltage DC-DC converter 22 into AC power and supply it to the driving motor M, or convert the AC power supplied from the driving motor M into DC power and supply it to the high voltage DC-DC converter 22.

The second inverter 24 is configured by bridge-connecting a high-side U-phase switching element and a low-side U-phase switching element connected to the U phase of the generator G, a high-side V-phase switching element and a low-side V-phase switching element connected to the V phase of the generator G, and a high-side W-phase switching element and a low-side W-phase switching element connected to the W phase of the generator G for each phase.

The second inverter 24 drives the switching elements of each phase described above on/off in accordance with a gate drive signal generated at a predetermined timing from the gate drive circuit of the system ECU 8 so as to convert the DC power supplied from the high voltage DC-DC converter 22 into AC power and supply it to the generator G, or convert the AC power supplied from the generator G into DC power and supply it to the high voltage DC-DC converter 22.

The low voltage DC-DC converter 25 is connected in parallel to the high voltage DC-DC converter 22 with respect to the first power lines 26p and 26n. The control circuit 25d drives the switching elements of the low voltage DC-DC converter 25 on/off by using the electric power supplied from the backup power supply unit 5, so as to step down the voltage V1 between the first power lines 26p and 26n, supply it to the low voltage battery 31, and charge the low voltage battery 31.

The low voltage circuit 3 includes the low voltage battery 31, a first system control power line 32, a first diode 33, a collision detection part 35, and a battery ECU 36.

The low voltage battery 31 is a secondary battery capable of discharging for converting chemical energy into electric energy as well as charging for converting electric energy into chemical energy. The present embodiment describes a case where a lead battery using lead as electrodes is used as the battery 3, but the disclosure is not limited thereto. In addition, the following describes a case where a battery having an output voltage less than the output voltage of the high voltage battery 21 is used as the low voltage battery 31. The following describes a case where the low voltage battery 31 is provided on the vehicle front side of the engine room (not shown) of the vehicle V in consideration of maintainability for the operator, but the disclosure is not limited thereto.

The first system control power line 32 is a power supply line that connects the low voltage battery 31 and the system ECU 8 and supplies electric power from the low voltage battery 31 to the system ECU 8. Hereinafter, the voltage of the first system control power line 32, that is, the output voltage of the low voltage battery 31, is denoted as VB.

The first diode 33 is provided on the first system control power line 32. The forward direction of the first diode 33 is a direction from the low voltage battery 31 toward the system ECU 8 and allows current from the low voltage battery 31 to the system ECU 8.

The collision detection part 35 determines whether the vehicle V has collided or rolled over by using a detection signal of an acceleration sensor (not shown), and transmits a collision detection signal to the battery ECU 36 when determining that the vehicle has collided or rolled over. The collision detection part 35 operates using electric power supplied from the low voltage battery 31.

The battery ECU 36 is a microcomputer in charge of control related to on/off of the contactors $28p$ and $28n$, monitoring of the states of the high voltage battery 21 and the low voltage battery 31, etc. The battery ECU 36 operates using electric power supplied from the low voltage battery 31.

The battery ECU 36 includes a battery sensor unit (not shown). The battery sensor unit is configured by a plurality of sensors necessary for estimating the internal state of the high voltage battery 21 such as the voltage, current, and temperature of the high voltage battery 21. The battery ECU 36 estimates the internal state of the high voltage battery 21 (for example, battery temperature, charge state, etc.) by using the detection signal from the battery sensor unit.

When a start switch is turned on by the driver, the battery ECU 36 is activated under the electric power supplied from the low voltage battery 31 and starts precharging of the plurality of capacitors 11 and 12 provided in the high voltage circuit 2. More specifically, the battery ECU 36 turns on the contactors $28p$ and $28n$ and performs precharging of the capacitors 11 and 12 by connecting the high voltage battery 21 to the first power lines $26p$ and $26n$. When performing precharging of the capacitors 11 and 12, the battery ECU 36 turns on the negative contactor $28n$ and turns on the contactor having a precharge resistor among the positive contactor $28p$. Further, after the precharging of the capacitors 11 and 12 is completed, the battery ECU 36 turns on the contactor having no precharge resistor among the positive contactor $28p$. Thereby, the inrush current to the capacitors 11 and 12 at the time of executing the precharging can be alleviated.

After turning on the contactors $28p$ and $28n$ as described above, the battery ECU 36 turns off the contactors $28p$ and $28n$ and disconnects the high voltage battery 21 from the first power lines $26p$ and $26n$ when the start switch is turned off by the driver to stop the power supply system 1 or when a collision detection signal is received from the collision detection part 35.

Moreover, the battery ECU 36 can perform CAN (controller area network) communication with the system ECU 8 via a CAN bus (not shown). Therefore, the battery ECU 36 transmits information about the internal state of the high voltage battery 21 estimated by using the battery sensor unit to the system ECU 8 via CAN communication. Further, while performing the precharging of the capacitors 11 and 12 by the above procedure, the precharging in progress is not hindered, the battery ECU 36 transmits a signal indicating this to the system ECU 8 via CAN communication. In addition, when receiving a collision detection signal from the collision detection part 35, the battery ECU 36 turns off the contactors $28p$ and $28n$ as described above, and transmits a discharge command signal to the system ECU 8 via CAN communication. The discharge command signal refers to a signal for instructing execution of a rapid discharge process (see FIG. 2) to be described later.

The backup power supply unit 5 includes third power lines $51p$ and $51n$, a second system control power line 53, a second diode 54, a step-down device 55, and a power supply IC (integrated circuit) 56.

The third power lines $51p$ and $51n$ are power supply lines that connect the second power lines $27p$ and $27n$ of the high voltage circuit 2 and the control circuit $25d$ of the low voltage DC-DC converter 25, and supply electric power from the second power lines $27p$ and $27n$ to the control circuit $25d$.

The step-down device 55 is provided on the third power lines $51p$ and $51n$. The step-down device 55 is an isolated DC-DC converter that includes a transformer connected to the side of the second power line $27p$ on the primary side and connected to the side of the control circuit $25d$ on the secondary side, and a switching element interrupting or continuing the current flowing to the primary side of the transformer. After the start switch is turned on and the contactors $28p$ and $28n$ are turned on as described above, the power supply IC 56 drives the switching element of the step-down device 55 on/off using the electric power supplied from the first power line $26p$ (or the second power line $27p$) and thereby steps down the electric power supplied from the second power line $27p$ and outputs it to the side of the control circuit $25d$.

The second system control power line 53 is a power supply line that connects the third power line $51p$ between the control circuit $25d$ and the step-down device 55 to the first system control power line 32 on the side of the system ECU 8 with respect to the first diode 33, and supplies electric power from the step-down device 55 to the system ECU 8. Hereinafter, the voltage of the second system control power line 53, that is, the output voltage of the step-down device 55, is denoted as Vcc. The following describes a case where the second system control power line 53 is connected to the first system control power line 32, but the disclosure is not limited thereto. The second system control power line 53 may be directly connected to the system ECU 8 without going through the first system control power line 32.

The second diode 54 is provided on the second system control power line 53. The forward direction of the second diode 54 is a direction from the step-down device 55 toward the system ECU 8 and allows current from the step-down device 55 to the system ECU 8.

Here, the setting of the output voltage Vcc of the step-down device 55 will be described. As shown in FIG. 1A, the low voltage battery 31 and the step-down device 55, which are the power supply sources, are respectively connected to the system ECU 8 in charge of running control of the vehicle V via the diodes 33 and 54. Therefore, it is possible to selectively supply electric power to the system ECU 8 from the power supply source that has higher potential among the two power supply sources. In the present embodiment, the low voltage battery 31 is used as the main power supply of the system ECU 8, and the step-down device 55 is to be used as the backup power supply of the system ECU 8 when a malfunction occurs in the low voltage battery 31 (more specifically, when the connection between the low voltage battery 31 and the system ECU 8 is lost or when the low voltage battery 31 is not in a normal state due to a collision of the vehicle V) and the low voltage battery 31 cannot supply electric power to the system ECU 8. Therefore, the output voltage Vcc of the step-down device 55 is set to be within the operating voltage range of the system ECU 8 and less than the output voltage VB in a state where the low voltage battery 31 is normal. Here, the state where the low voltage battery 31 is not normal refers to a state where the output voltage of the low voltage battery 31 is significantly less than that of a new battery due to excessive deterioration of the low voltage battery 31, for example.

The system ECU 8 is configured by a main microcomputer that executes running control of the vehicle V and the rapid discharge process shown in FIG. 2 (to be described later), a gate drive circuit that drives the switching elements of the high voltage DC-DC converter 22, the first inverter 23, and the second inverter 24 on/off in accordance with a command signal transmitted from the main microcomputer, etc. Here, the rapid discharge process refers to a series of processes for discharging the charges stored in the capacitors 11 and 12 of the high voltage circuit 2 that are at a high voltage when the vehicle V collides.

The main microcomputer, the gate drive circuit, etc. that constitute the system ECU 8 execute running control of the vehicle V and the rapid discharge process using the electric power supplied from the low voltage battery 31 or the backup power supply unit 5. When the start switch (not shown) is turned on by the driver to start the power supply system 1, the system ECU 8 is activated under the electric power supplied from the low voltage battery 31, and then running control or rapid discharge control is executed using the electric power supplied from the low voltage battery 31 or the backup power supply unit 5.

Further, the high voltage circuit 2 is provided with a primary side voltage sensor 93 and a secondary side voltage sensor 94 for detecting the voltage of the high voltage circuit 2. The primary side voltage sensor 93 detects the primary side voltage V1 and transmits a signal corresponding to the detected value to the system ECU 8. The secondary side voltage sensor 94 detects the secondary side voltage V2 and transmits a signal corresponding to the detected value to the system ECU 8.

Figure 2:
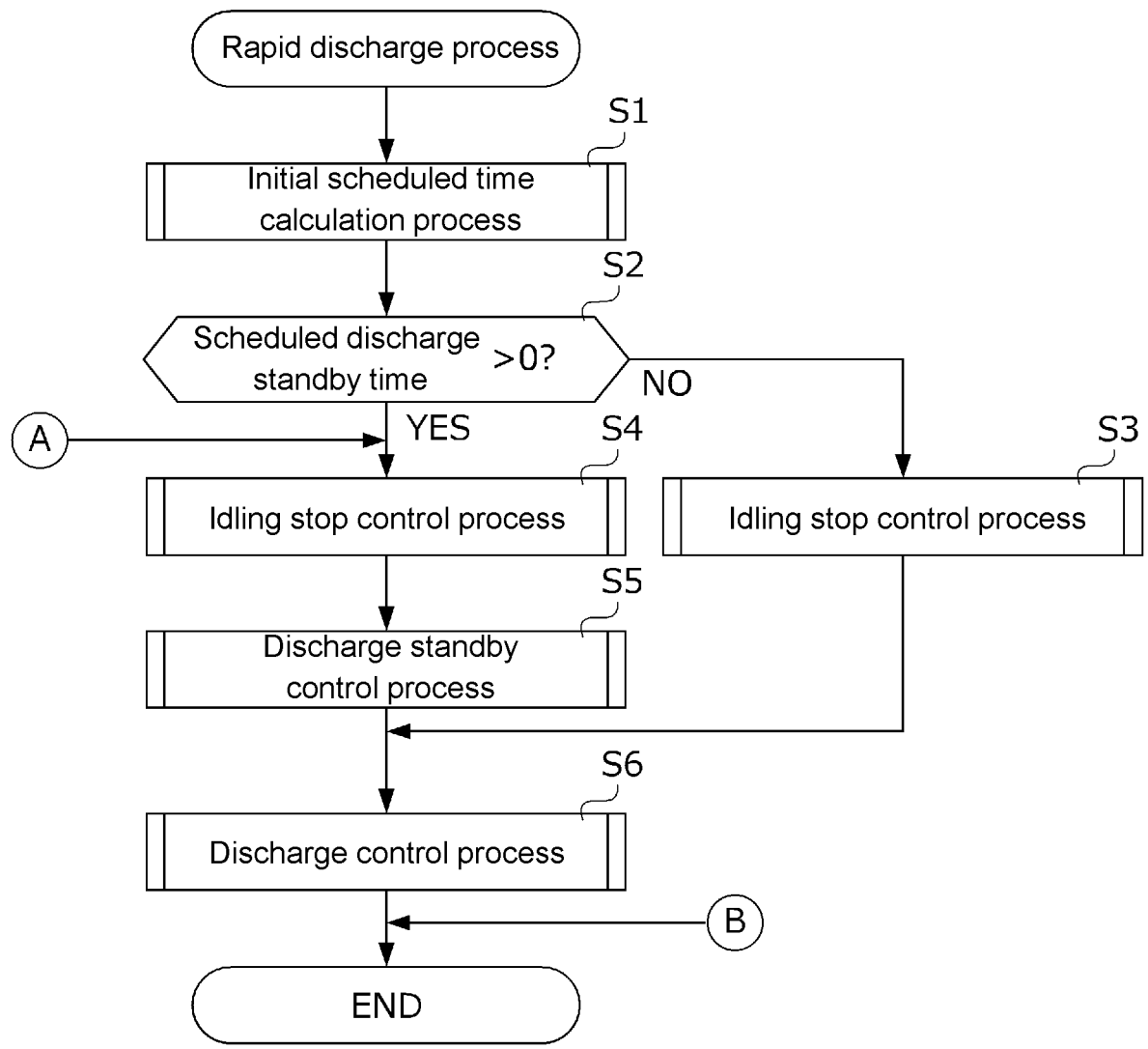
FIG. 2 is a flow chart showing a specific procedure of the rapid discharge process.

FIG. 2 is a flow chart showing a specific procedure of the rapid discharge process. The rapid discharge process is a process for discharging the charges of the capacitors 11 and 12 provided in the high voltage circuit 2 to reduce the secondary side voltage V2 at the time of a vehicle collision, and the rapid discharge process is executed in response to the determination that a discharge start condition has been established in the system ECU 8. Here, the discharge start condition includes a condition that can be established when the vehicle collides, for example, when the system ECU 8 receives the discharge command signal from the battery ECU 36.

In S1, the system ECU 8 executes an initial scheduled time calculation process and proceeds to S2. As described hereinafter, the rapid discharge process mainly includes three processes: an idling stop control process (see S3 and S4), a discharge standby control process (see S5), and a discharge control process (see S6).

The idling stop control process is a process for stopping the rotation of the driving motor M after the vehicle collides, more specifically, a process for reducing the rotation speed of the driving motor M to a predetermined target stop rotation speed.

The discharge control process is a process for discharging the charges of the capacitors 11 and 12 and reducing the secondary side voltage to a predetermined target stop voltage after stopping the rotation of the driving motor M by the idling stop control process.

The discharge standby control process is a process for temporarily standing by for the start of the discharge control process after stopping the rotation of the driving motor M by the idling stop control process.

In the initial scheduled time calculation process of S1, before starting the idling stop control process, the discharge standby control process, and the discharge control process, the system ECU 8 calculates a scheduled time corresponding to a predicted value for the execution time of the three processes.

Figure 3:
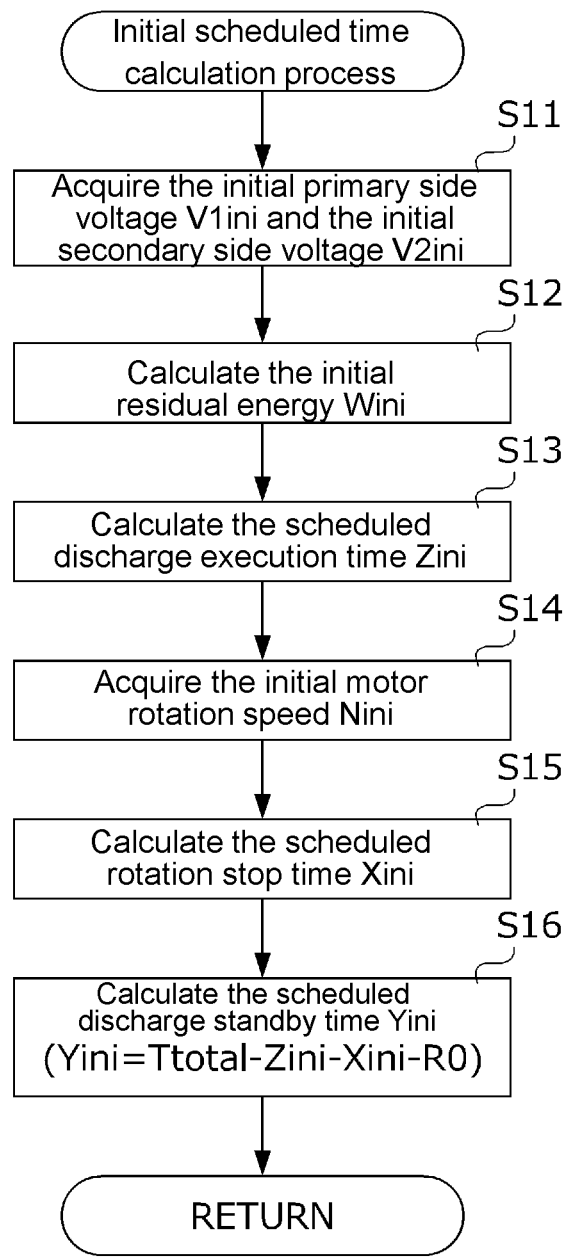
FIG. 3 is a flow chart showing a specific procedure of the initial scheduled time calculation process.
Figure 4:
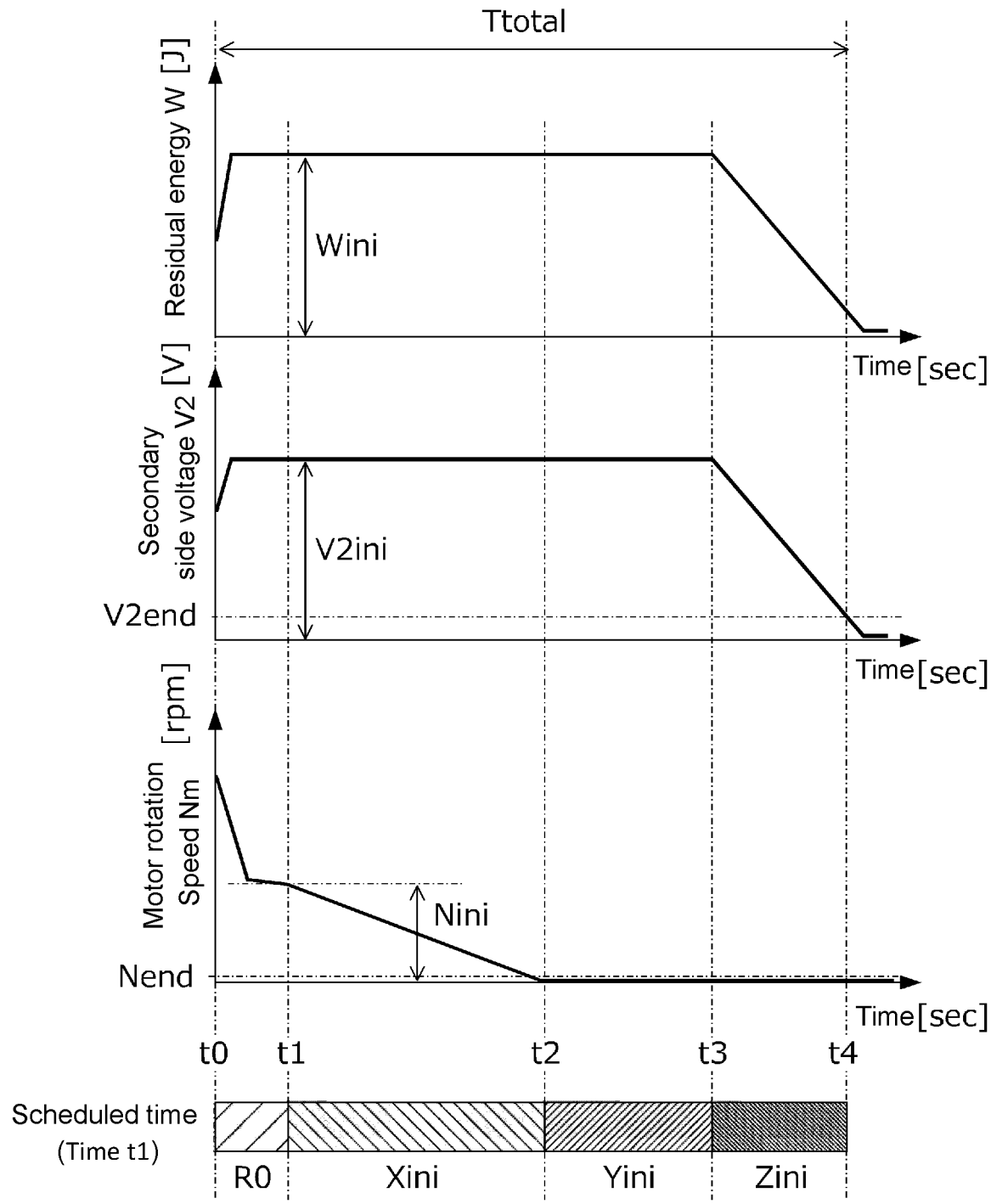
FIG. 4 is a time chart for illustrating a procedure of the initial scheduled time calculation process.

FIG. 3 is a flow chart showing a specific procedure of the initial scheduled time calculation process. FIG. 4 is a time chart for illustrating a procedure of the initial scheduled time calculation process. More specifically, FIG. 4 shows an example of the temporal change of the residual energy W of the high voltage circuit 2 in the rapid discharge process, the temporal change of the secondary side voltage V2 in the rapid discharge process, the temporal change of the motor rotation speed Nm in the rapid discharge process, and the breakdown of the scheduled time calculated by the initial scheduled time calculation process in order from the upper part to the lower part. In addition, in FIG. 4, the time t0 is the time of the collision of the vehicle. The time t1 is the time when the discharge start condition is established and the rapid discharge process is started. That is, the time t1 is the execution time of the initial scheduled time calculation process of FIG. 3, and is also the time of the start of the idling stop control process to be described later. The time t2 is the time when the motor rotation speed Nm becomes equal to or less than the target stop rotation speed Nend due to the idling stop control process. The time t3 is the time of the start of the discharge control process. The time t4 is the time when the secondary side voltage V2 becomes equal to or less than the target stop voltage V2end due to the discharge control process.

In the rapid discharge process of FIG. 2, the target discharge time Ttotal is set for the discharge time from when the vehicle collides at the time t0 to when the secondary side voltage V2 becomes equal to or less than the target stop voltage V2end at the time t4, and the idling stop control process, the discharge standby control process, and the discharge control process are executed so that the secondary side voltage V2 becomes equal to or less than the target stop voltage V2end before the target discharge time Ttotal elapses. Here, when the discharge time and the secondary side voltage at the end of the discharge control process are prescribed by law, for example, the target discharge time Ttotal and the target stop voltage V2end are set by adding a predetermined margin to the specified time and specified voltage defined by law. More specifically, the target discharge time Ttotal is set by subtracting a predetermined positive margin time from the specified time defined by law, and the target stop voltage V2end is set by subtracting a predetermined positive margin voltage from the specified voltage defined by law.

First, in S11, the system ECU 8 uses the primary side voltage sensor 93 and the secondary side voltage sensor 94 to acquire an initial primary side voltage V1ini and an initial secondary side voltage V2ini, which are the primary side voltage V1 and the secondary side voltage V2 at the time when the discharge start condition is established (time t1 in FIG. 4), and proceeds to S12.

Next, in S12, the system ECU 8 calculates the initial residual energy Wini, which is the residual energy in the high voltage circuit 2 at the time when the discharge start condition is established (time t1 in FIG. 4) based on the initial primary side voltage V1ini and the initial secondary side voltage V2ini acquired in S11, and proceeds to S13. Here, the residual energy in the high voltage circuit 2 refers to the sum of the energy stored in the plurality of capacitors 11 and 12 provided in the high voltage circuit 2. The system ECU 8 calculates the initial residual energy Wini by the following equation (1) based on the initial primary side voltage V1ini and the initial secondary side voltage V2ini acquired in S11, the known capacitance C1 of the primary side capacitor 11, and the known capacitance C2 of the secondary side capacitor 12.

$$Wini = \tfrac{1}{2} \times C1 \times (V1ini)^2 + \tfrac{1}{2} \times C2 \times (V2ini)^2 \quad (1)$$

Next, in S13, the system ECU 8 calculates the scheduled discharge execution time Zini, which is the time required for reducing the secondary side voltage to the target stop voltage V2end by executing the discharge control process, based on the initial residual energy Wini calculated in S12, and proceeds to S14. As shown by the times t3 to t4 in FIG. 4, when the discharge control process is executed, charges are discharged from the capacitors 11 and 12, and the secondary side voltage V2 is reduced. The system ECU 8 stores a map and an arithmetic expression that define the correlation between the initial residual energy Wini and the scheduled discharge execution time Zini, and the scheduled discharge execution time Zini is calculated by using the initial residual energy Wini acquired in S11 and the map and arithmetic expression described above. The map and arithmetic expression are constructed by conducting tests in advance. As shown in FIG. 4, the scheduled discharge execution time Zini becomes longer as the initial secondary side voltage Vini gets higher or the initial residual energy Wini increases.

Next, in S14, the system ECU 8 uses the first resolver R1 to acquire the initial motor rotation speed Nini, which is the motor rotation speed Nm at the time when the discharge start condition is established (time t1 in FIG. 4), and proceeds to S15.

Next, in S15, the system ECU 8 calculates the scheduled rotation stop time Xini, which is the time required for reducing the motor rotation speed Nm to the target stop rotation speed Nend by executing the idling stop control process, based on the initial motor rotation speed Nini acquired in S14, and proceeds to S16. As shown by the times t1 to t2 in FIG. 4, if no external force is acting on the driving wheels, the motor rotation speed Nm decreases when the idling stop control process is executed. The system ECU 8 stores a map and an arithmetic expression that define the correlation between the initial motor rotation speed Nini and the scheduled rotation stop time Xini, and the scheduled rotation stop time Xini is calculated by using the initial motor rotation speed Nini acquired in S14 and the map and arithmetic expression described above. The map and arithmetic expression are constructed by conducting tests in advance. As shown in FIG. 4, the scheduled rotation stop time Xini becomes longer as the initial motor rotation speed Nini increases.

Next, in S16, the system ECU 8 calculates the scheduled discharge standby time Yini by subtracting the scheduled discharge execution time Zini calculated in S13, the scheduled rotation stop time Xini calculated in S15, and the reaction time R0 corresponding to the time from when the vehicle collides to when the discharge start condition is established from the target discharge time Ttotal, as shown in the following equation (2), and proceeds to S2 of FIG. 2. Here, a predetermined value is used as the reaction time R0.

$$Yini = Ttotal - Zini - Xini - R0 \quad (2)$$

As shown in FIG. 4, the scheduled discharge standby time Yini calculated according to the above equation (2) corresponds to the upper limit of the discharge standby time that can be secured when the start time t2 of the discharge control process is delayed as much as possible so that the secondary side voltage V2 becomes equal to or less than the target stop voltage V2end at the time t4 when the target discharge time Ttotal elapses after the vehicle collides at the time t0.

Returning to FIG. 2, in S2, the system ECU 8 determines whether the scheduled discharge standby time Yini calculated in the initial scheduled time calculation process is greater than 0. The system ECU 8 proceeds to S4 when the determination result of S2 is YES, and proceeds to S3 when the determination result is NO. Here, the case where the scheduled discharge standby time Yini is greater than 0 corresponds to a case where it is predicted that a discharge standby time greater than 0 can be secured from the end of the idling stop control process to the start of the discharge control process. On the other hand, the case where the scheduled discharge standby time Yini is equal to or less than 0 corresponds to a case where it is predicted that a discharge standby time greater than 0 cannot be secured from the end of the idling stop control process to the start of the discharge control process, that is, a case where the secondary side voltage may not be reduced to the target stop voltage V2end or less before the target discharge time Ttotal elapses even if the discharge control process is started immediately after the idling stop control process is completed.

In S3, the system ECU 8 executes the idling stop control process for reducing the motor rotation speed Nm, and proceeds to S6 when the motor rotation speed Nm becomes equal to or less than the target stop rotation speed Nend. In this idling stop control process, the system ECU 8 executes a known control method (for example, three-phase short-circuit control of the first inverter 23) for reducing the motor rotation speed Nm until the motor rotation speed Nm becomes equal to or less than the target stop rotation speed Nend.

In S6, the system ECU 8 executes the discharge control process for reducing the secondary side voltage V2, and ends the rapid discharge process of FIG. 2 when the secondary side voltage V2 becomes equal to or less than the target stop voltage V2end. In this discharge control process, the system ECU 8 executes a known control method for rapidly reducing the secondary side voltage V2 (for example, a method of discharging the charges stored in the capacitors 11 and 12 by switching control of the first inverter 23 and the second inverter 24, or a method of discharging the charges stored in the capacitors 11 and 12 using a discharge resistor (not shown)).

As described above, when the scheduled discharge standby time Yini is equal to or less than 0, the system ECU 8 executes the idling stop control process (see S3) immediately after the discharge start condition is established, and executes the discharge control process (see S6) as soon as the idling stop control process is completed to reduce the secondary side voltage V2 as soon as possible.

In S4, the system ECU 8 executes the idling stop control process by the same procedure as S3, and proceeds to S5 when the motor rotation speed Nm becomes equal to or less than the target stop rotation speed Nend. In S5, the system ECU 8 executes the discharge standby control process for a predetermined time, and then proceeds to S6. The specific procedure of the discharge standby control process will be described in detail later with reference to FIG. 5. In S6, the system ECU 8 executes the discharge control process for reducing the secondary side voltage V2 as described above, and ends the rapid discharge process of FIG. 2 when the secondary side voltage V2 becomes equal to or less than the target stop voltage V2end. As described with reference to FIG. 1A and FIG. 1B, the first power line 26p and the second power line 27p are connected via a diode that takes a direction from the side of the first power line 26p toward the side of the second power line 27p as the forward direction. Therefore, the primary side voltage V1 and the secondary side voltage V2 during the execution of the discharge control process are substantially equal. Therefore, in the present embodiment, the timing of ending the discharge control process can be determined by the secondary side voltage V2.

As described above, when the scheduled discharge standby time Yini is greater than 0, the system ECU 8 executes the idling stop control process (see S4) immediately after the discharge start condition is established, starts the discharge standby control process (see S5) as soon as the idling stop control process is completed, and executes the discharge control process (see S6) after the discharge standby control process is executed for a predetermined time.

Figure 5:
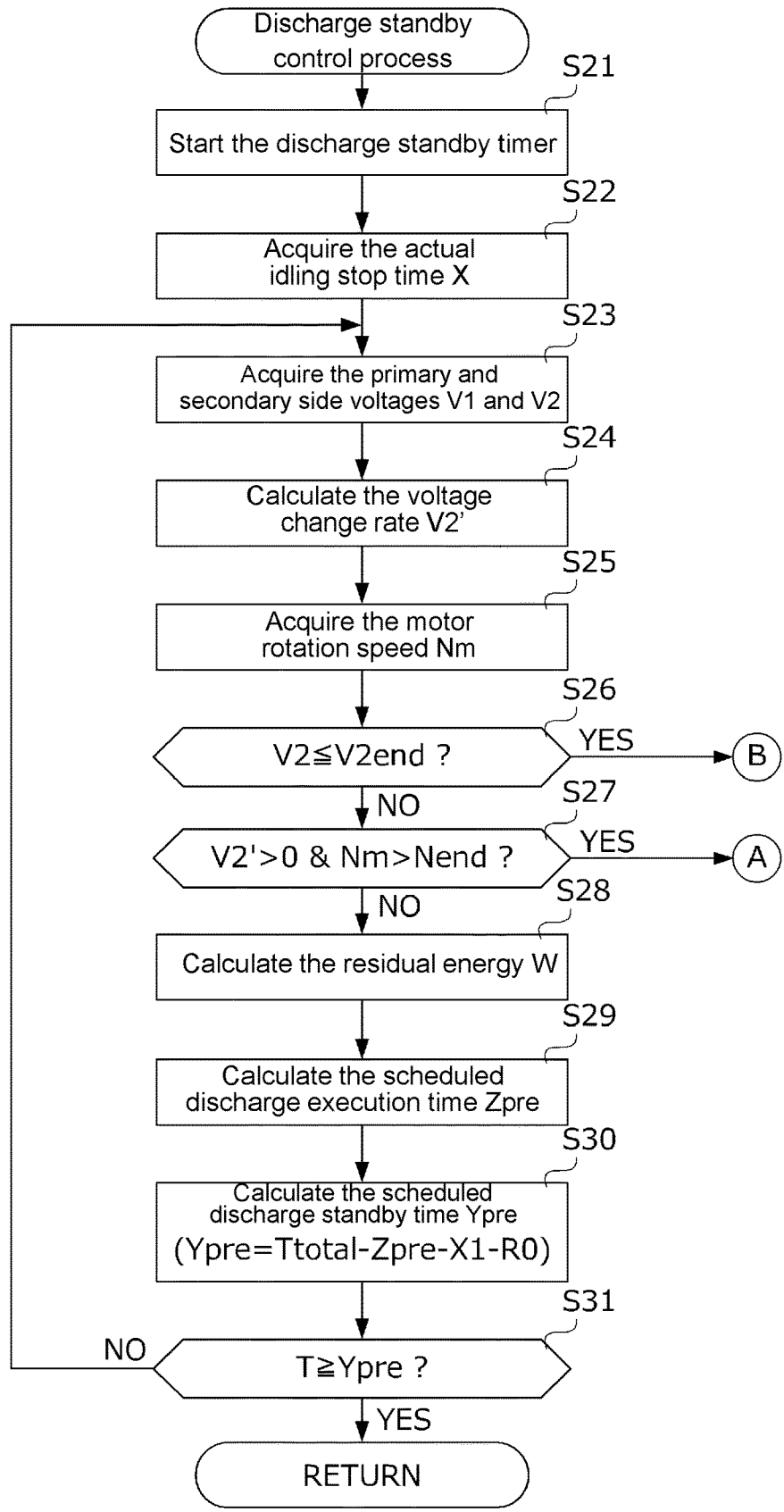
FIG. 5 is a flow chart showing a specific procedure of the discharge standby control process.

FIG. 5 is a flow chart showing a specific procedure of the discharge standby control process. In S21, the system ECU 8 starts a discharge standby timer that measures the standby time T, which is the execution time of the discharge standby control process, and proceeds to S22.

In S22, the system ECU 8 acquires the actual idling stop time X, and proceeds to S23. The actual idling stop time X refers to the execution time of the idling stop control process of S4. In other words, it corresponds to the time taken from when the idling stop control process of S4 is started to when the motor rotation speed Nm becomes equal to or less than the target stop rotation speed Nend. As described with reference to FIG. 11, when the idling stop control process is executed twice or more, the system ECU 8 sets the sum of the execution times X1, X2, . . . of the idling stop control processes and the execution times Y1, . . . of the discharge standby control processes executed in the past as the actual idling stop time X.

In S23, the system ECU 8 uses the primary side voltage sensor 93 and the secondary side voltage sensor 94 to acquire the current primary side voltage V1 and secondary side voltage V2 during the execution of the discharge standby control process, and proceeds to S24.

In S24, the system ECU 8 calculates the voltage change rate V2' by differentiating the secondary side voltage V2 acquired in S23 with time, and proceeds to S25.

In S25, the system ECU 8 uses the first resolver R1 to acquire the current motor rotation speed Nm during the execution of the discharge standby control process, and proceeds to S26.

In S26, the system ECU 8 determines whether the secondary side voltage V2 acquired in S23 is equal to or less than the target stop voltage V2end. When the determination result of S26 is YES, that is, when the secondary side voltage V2 is reduced to the target stop voltage V2end or less while the discharge standby control process is being executed, the system ECU 8 determines that it is not necessary to execute the discharge control process (see S6 in FIG. 2), and ends the rapid discharge process without executing the discharge control process. When the determination result of S26 is NO, the system ECU 8 proceeds to S27.

In S27, the system ECU 8 determines whether the voltage change rate V2' calculated in S24 is greater than 0 and whether the motor rotation speed Nm acquired in S25 is greater than the target stop rotation speed Nend. When the determination result of S27 is YES, that is, when the motor rotation speed Nm rises again for some reason and causes the secondary side voltage V2 to rise again after the idling stop control process (see S4 in FIG. 2) is executed until the motor rotation speed Nm becomes equal to or less than the target stop rotation speed Nend, the system ECU 8 proceeds to S4 in FIG. 2, and executes the idling stop control process again. When the determination result of S27 is NO, the system ECU 8 proceeds to S28.

In S28, the system ECU 8 calculates the residual energy W in the high voltage circuit 2 based on the primary side voltage V1 and the secondary side voltage V2 acquired in S23, and proceeds to S29. The system ECU 8 calculates the residual energy W by the following equation (3) based on the primary side voltage V1 and the secondary side voltage V2 acquired in S23, the known capacitance C1 of the primary side capacitor 11, and the known capacitance C2 of the secondary side capacitor 12.

$$W = \tfrac{1}{2} \times C1 \times (V1)^2 + \tfrac{1}{2} \times C2 \times (V2)^2 \qquad (3)$$

In S29, the system ECU 8 calculates the scheduled discharge execution time Zpre based on the residual energy W acquired in S28, and proceeds to S30. The scheduled discharge execution time Zpre corresponds to the time required for discharging the charges remaining in the capacitors 11 and 12 and reducing the secondary side voltage V2 to the target stop voltage V2end or less by executing the discharge control process (see S6 in FIG. 2). The system ECU 8 stores a map and an arithmetic expression that define the correlation between the residual energy W and the scheduled discharge execution time Zpre, and the scheduled discharge execution time Zpre is calculated by using the residual energy W acquired in S28 and the map and arithmetic expression described above. According to the map and arithmetic expression, the scheduled discharge execution time Zpre becomes longer as the residual energy W increases.

In S30, the system ECU 8 calculates the scheduled discharge standby time Ypre by subtracting the scheduled discharge execution time Zpre calculated in S29, the actual idling stop time X acquired in S22, and the reaction time R0 from the target discharge time Ttotal, as shown in the following equation (4), and proceeds to S31. The scheduled discharge standby time Ypre calculated by the following equation (4) corresponds to the time required for standing by for the execution of the discharge control process in order to reduce the secondary side voltage V2 to the target stop voltage V2end or less when the target discharge time Ttotal has elapsed.

$$Ypre = Ttotal - Zpre - X - R0 \qquad (4)$$

In S31, the system ECU 8 determines whether the standby time T measured by the discharge standby timer started in S21 is equal to or longer than the scheduled discharge standby time Ypre calculated in S30. When the determination result of S31 is NO, that is, when it can be determined that it is possible to discharge to reduce the secondary side voltage V2 to the target stop voltage V2end or less within the target discharge time Ttotal, the system ECU 8 should continue standing by for the start of the discharge control process, and returns to S23. Further, when the determination result of S31 is YES, that is, when it can be determined that it is not possible to discharge to reduce the secondary side voltage V2 to the target stop voltage V2end or less within the target discharge time Ttotal, the system ECU 8 ends the discharge standby control process in FIG. 5, and proceeds to S6 in FIG. 2 to start the discharge control process.

As described above, in the discharge standby control process of FIG. 5, the system ECU 8 repeatedly calculates the residual energy W, the scheduled discharge execution time Zpre, and the scheduled discharge standby time Ypre based on the secondary side voltage V2 acquired while standing by for the execution of the discharge control process, and starts the discharge control process after the scheduled discharge standby time Ypre elapses.

Next, examples of the temporal changes of the residual energy W, the secondary side voltage V2, and the motor rotation speed Nm after the vehicle collision, realized by the rapid discharge process shown in FIG. 2 to FIG. 5, will be described with reference to the time charts of FIG. 6 to FIG. 11. FIG. 6 to FIG. 11 are time charts showing the temporal changes of the residual energy W, the secondary side voltage V2, and the motor rotation speed Nm realized by the above rapid discharge process. The lower parts of FIG. 6 to FIG. 11 illustrate the scheduled times (Xini, Yini, Zini) calculated in the initial scheduled time calculation process, the scheduled times (Ypre, Zpre) calculated immediately after the start of the discharge standby control process, and the actual execution times (X,Y,Z) of the idling stop control process, the discharge standby control process, and the discharge control process.

Figure 6:
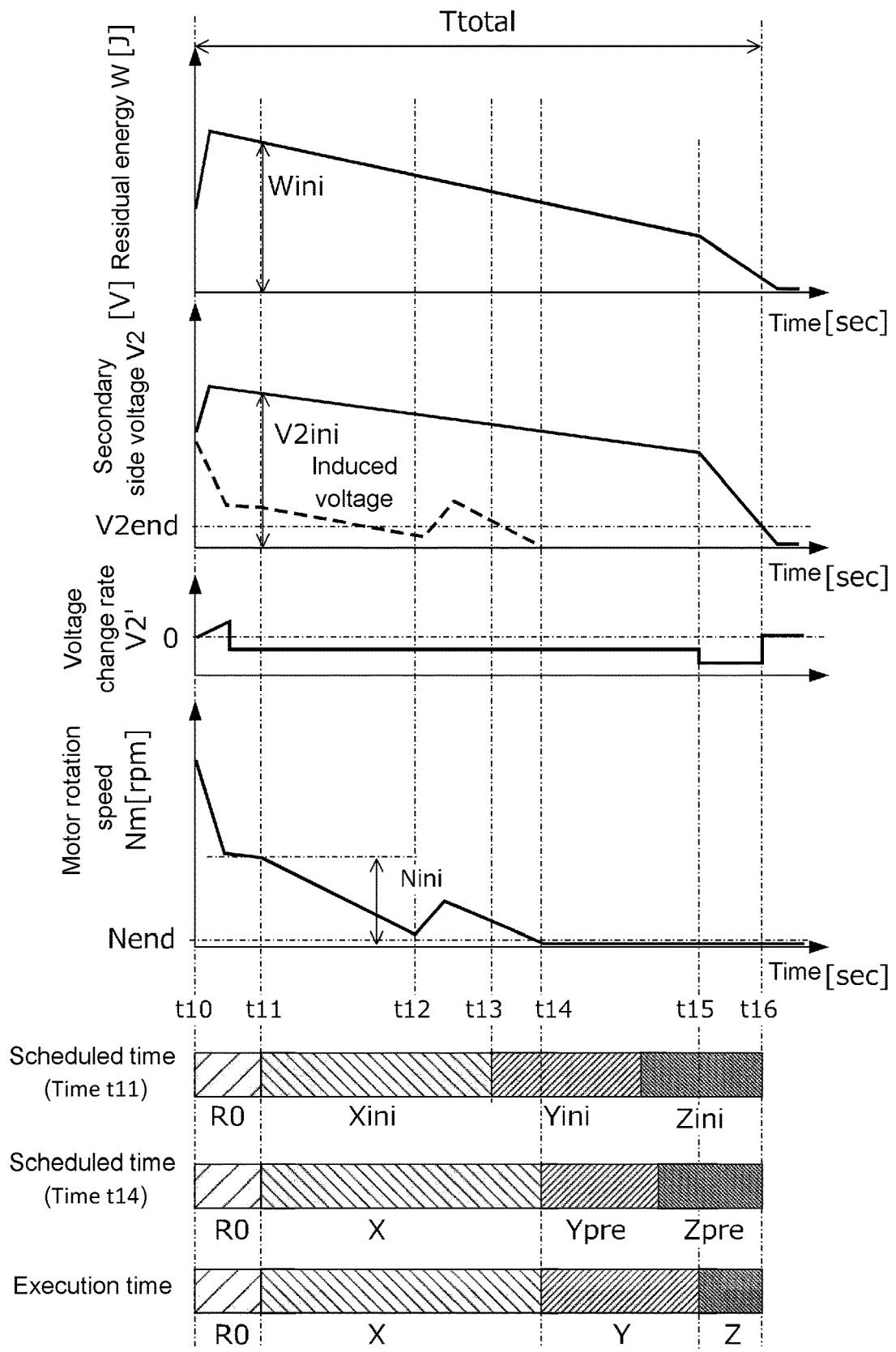
FIG. 6 is a time chart showing temporal changes of the secondary side voltage and the motor rotation speed realized by the rapid discharge process of FIG. 2.

FIG. 6 is a time chart showing the temporal changes of the residual energy W, the secondary side voltage V2, and the motor rotation speed Nm realized by the above rapid discharge process. In FIG. 6, the time t10 is the time of the collision of the vehicle. The time t11 is the time when the discharge start condition is established and the rapid discharge process is started. That is, the time t11 is the execution time of the initial scheduled time calculation process of FIG. 3, and is also the time of the start of the idling stop control process. The time t14 is the time of the start of the discharge standby control process. The time t15 is the time of the start of the discharge control process. Moreover, the time t16 is the time when the secondary side voltage V2 becomes equal to or less than the target stop voltage V2end due to the discharge control process.

FIG. 6 shows a case where the motor rotation speed Nm rises at the time t12 during the execution of the idling stop control process, and the induced voltage rises again due to the driving motor M as indicated by the broken line. Further, FIG. 6 shows a case where the induced voltage generated by the driving motor M is constantly equal to or less than the voltage of the capacitor 12 and does not affect the rise of the secondary side voltage V2.

As shown in FIG. 6, when the motor rotation speed Nm rises during the execution of the idling stop control process, the end time t14 of the idling stop control process becomes later than the scheduled time t13 correspondingly. Further, the system ECU 8 repeatedly calculates the scheduled discharge standby time Ypre and the scheduled discharge execution time Zpre in accordance with the change of the secondary side voltage V2 while performing the discharge standby control process after the time t14, and starts the discharge control process at the time t15 when the discharge standby time T becomes equal to or longer than the scheduled discharge standby time Ypre. As a result, the secondary side voltage V2 becomes equal to or less than the target stop voltage V2end at the time t16 when the target discharge time Ttotal elapses.

Figure 7:
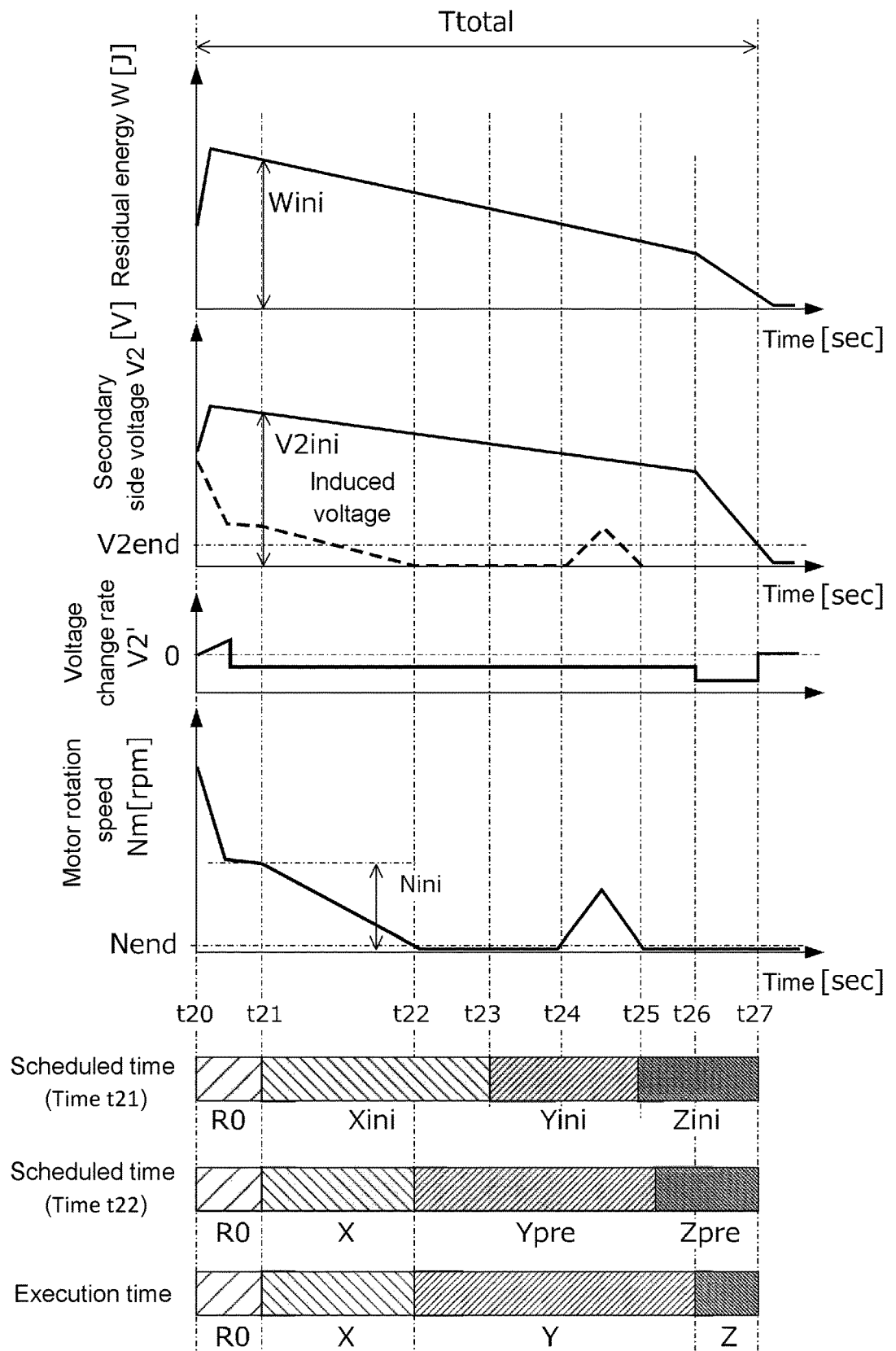
FIG. 7 is a time chart showing temporal changes of the secondary side voltage and the motor rotation speed realized by the rapid discharge process of FIG. 2.

FIG. 7 is a time chart showing the temporal changes of the residual energy W, the secondary side voltage V2, and the motor rotation speed Nm realized by the above rapid discharge process. In FIG. 7, the time t20 is the time of the collision of the vehicle. The time t21 is the time when the discharge start condition is established. The time t22 is the time of the start of the discharge standby control process. The time t26 is the time of the start of the discharge control process. In addition, the time t27 is the time when the secondary side voltage V2 becomes equal to or less than the target stop voltage V2end due to the discharge control process.

FIG. 7 is different from the example of FIG. 6 in the timing at which the motor rotation speed Nm rises. More specifically, FIG. 7 shows a case where the motor rotation speed Nm rises from the times t24 to t25 during the execution of the discharge standby control process, and the induced voltage rises as indicated by the broken line. In addition, FIG. 7 shows a case where the induced voltage generated by the driving motor M is equal to or less than the voltage of the capacitor 12 and does not affect the rise of the secondary side voltage V2.

The example of FIG. 7 shows a case where the motor rotation speed Nm becomes equal to or less than the target stop rotation speed Nend at the time t22 that is earlier than the original scheduled time t23. Therefore, in the example of FIG. 7, at the time t22 that is earlier than the original scheduled time t23, the idling stop control process shifts to the discharge standby control process. Further, the system ECU 8 repeatedly calculates the scheduled discharge standby time Ypre and the scheduled discharge execution time Zpre in accordance with the change of the secondary side voltage V2 while performing the discharge standby control after the time t22, and starts the discharge control process at the time t26 when the discharge standby time becomes equal to or longer than the scheduled discharge standby time Ypre. As a result, the secondary side voltage V2 becomes equal to or less than the target stop voltage V2end at the time t27 when the target discharge time Ttotal elapses.

In the example of FIG. 7, the motor rotation speed Nm becomes equal to or greater than the target stop rotation speed Nend between the times t24 and t25 while the discharge standby control process is performed between the times t22 and t26. However, in the example of FIG. 7, the induced voltage generated between the times t24 and t25 due to the rise of the motor rotation speed Nm is less than the voltage of the capacitor 12, and the voltage change rate V2' of the secondary side voltage V2 does not become positive. Therefore, the system ECU 8 continues executing the discharge standby control process without executing the idling stop control process again even if the motor rotation speed Nm becomes equal to or greater than the target stop rotation speed Nend during the execution of the discharge standby control process (see S27 in FIG. 5).

Figure 8:
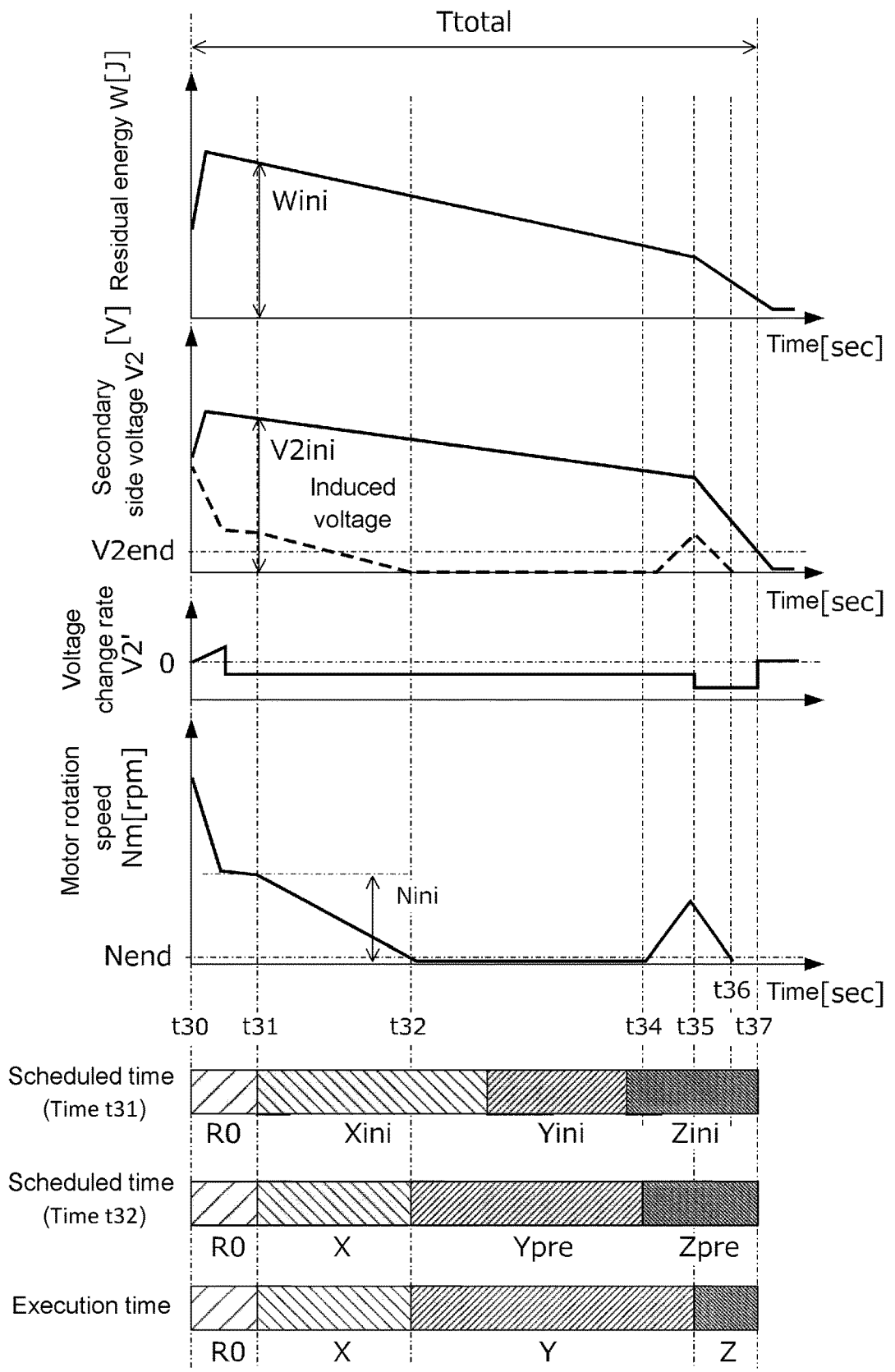
FIG. 8 is a time chart showing temporal changes of the secondary side voltage and the motor rotation speed realized by the rapid discharge process of FIG. 2.

FIG. 8 is a time chart showing the temporal changes of the residual energy W, the secondary side voltage V2, and the motor rotation speed Nm realized by the above rapid discharge process. In FIG. 8, the time t30 is the time of the collision of the vehicle. The time t31 is the time when the discharge start condition is established. The time t32 is the time of the start of the discharge standby control process. The time t35 is the time of the start of the discharge control process. The time t37 is the time when the secondary side voltage V2 becomes equal to or less than the target stop voltage V2end due to the discharge control process.

FIG. 8 is different from the examples of FIG. 6 and FIG. 7 in the timing at which the motor rotation speed Nm rises. More specifically, FIG. 8 shows a case where the motor rotation speed Nm rises before and after the time t35 when the discharge standby control process shifts to the discharge control process, and the induced voltage of the driving motor M rises as indicated by the broken line. Further, the example of FIG. 8 shows a case where the induced voltage generated by the driving motor M is equal to or less than the voltage of the capacitor 12 and does not affect the rise of the secondary side voltage V2.

According to the example of FIG. 8, the idling stop control process, the discharge standby control process, and the discharge control process are started at substantially the same timing as in the example of FIG. 7. In the example of FIG. 8, the motor rotation speed Nm becomes equal to or greater than the target stop rotation speed Nend between the times t34 and t36 when the discharge standby control process and the discharge control process are being performed. However, in the example of FIG. 8, the induced voltage generated between the times t34 and t36 due to the rise of the motor rotation speed Nm is less than the voltage of the capacitor 12, and therefore does not affect the change of the secondary side voltage V2. Therefore, as shown in FIG. 8, the secondary side voltage V2 can be reduced to the target stop voltage V2end or less at the time t37 when the target discharge time Ttotal elapses.

Figure 9:
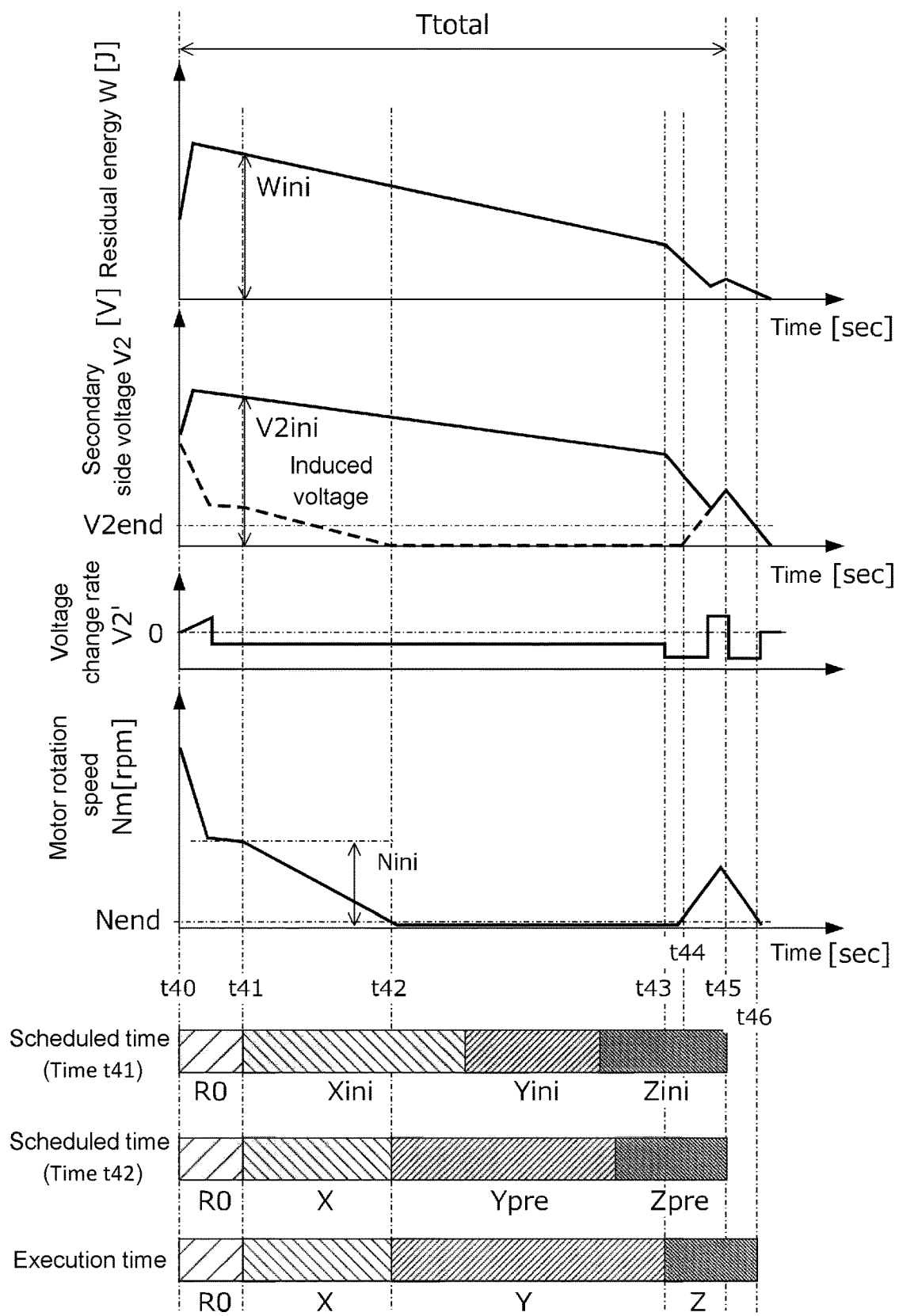
FIG. 9 is a time chart showing temporal changes of the secondary side voltage and the motor rotation speed realized by the rapid discharge process of FIG. 2.

FIG. 9 is a time chart showing the temporal changes of the residual energy W, the secondary side voltage V2, and the motor rotation speed Nm realized by the above rapid discharge process. In FIG. 9, the time t40 is the time of the collision of the vehicle. The time t41 is the time when the discharge start condition is established. The time t42 is the time of the start of the discharge standby control process. The time t43 is the time of the start of the discharge control process. In addition, the time t46 is the time when the secondary side voltage V2 becomes equal to or less than the target stop voltage V2end due to the discharge control process.

FIG. 9 is different from the examples of FIG. 6 to FIG. 8 in the timing at which the motor rotation speed Nm rises. More specifically, FIG. 9 shows a case where the motor rotation speed Nm rises during the execution of the discharge control process, and the induced voltage rises due to the driving motor M as indicated by the broken line. Further, FIG. 9 shows a case where the induced voltage generated by the driving motor M becomes equal to or greater than the voltage of the capacitor 12 and affects the rise of the secondary side voltage V2.

According to the example of FIG. 9, the idling stop control process, the discharge standby control process, and the discharge control process are started at substantially the same timing as in the example of FIG. 8. In the example of FIG. 9, after the discharge control process is started at the time t43, the motor rotation speed Nm becomes equal to or greater than the target stop rotation speed Nend between the times t44 and t46, and thereby the secondary side voltage V2 rises. Therefore, as shown in FIG. 9, although the secondary side voltage V2 does not become equal to or less than the target stop voltage V2end at the time t45 when the target discharge time Ttotal elapses, by continuing executing the discharge control process after the target discharge time Ttotal elapses, the secondary side voltage V2 can be reduced to the target stop voltage V2end or less at the time t46. Thus, in the example of FIG. 9, the secondary side voltage V2 cannot be reduced to the target stop voltage V2end or less before the target discharge time Ttotal elapses. However, by adding a margin to the specified time and specified voltage defined by law to set the target discharge time Ttotal and the target stop voltage V2end, as described above, in some cases, the secondary side voltage V2 can be reduced to the specified voltage or less within the specified time.

Figure 10:
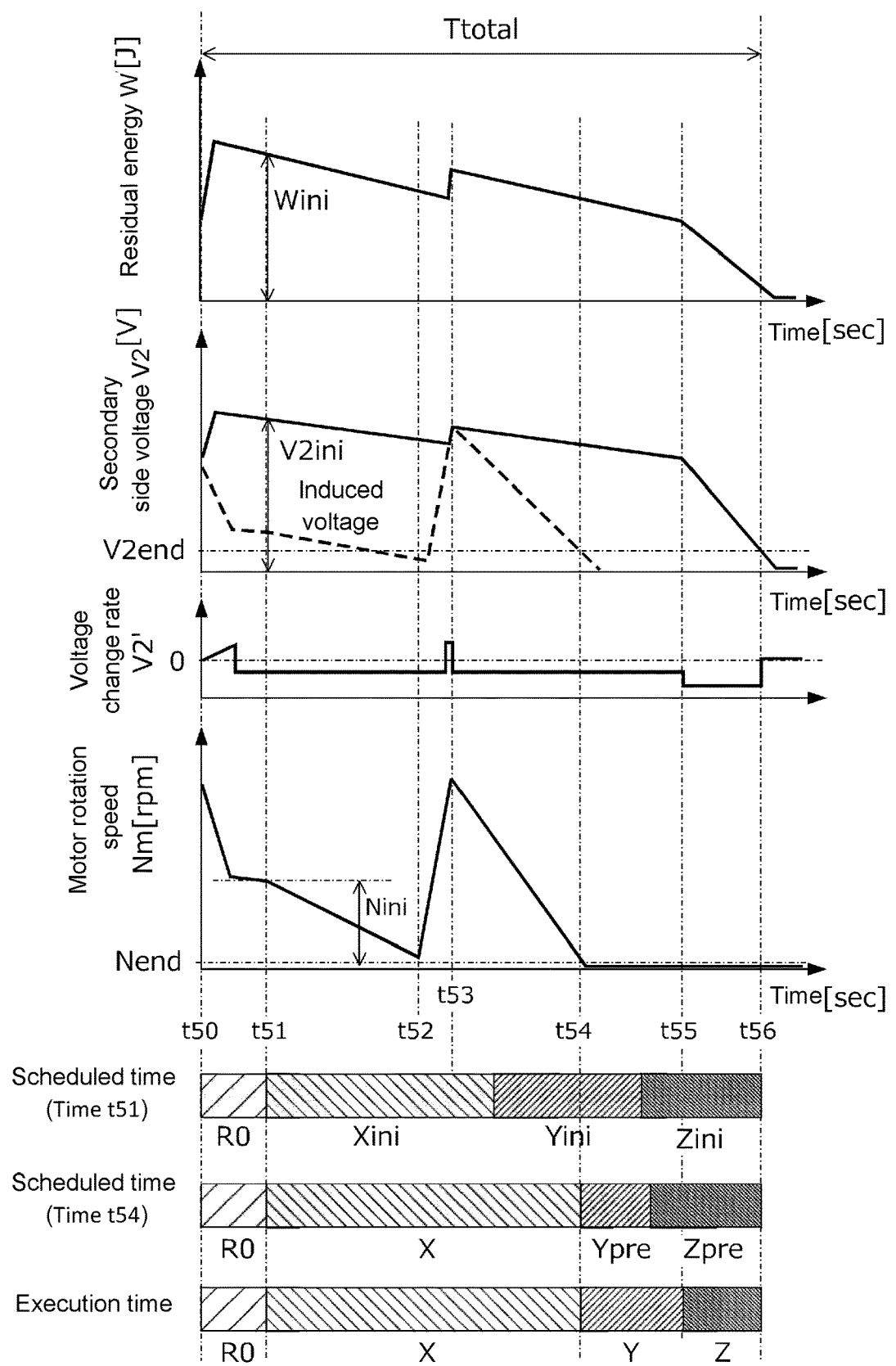
FIG. 10 is a time chart showing temporal changes of the secondary side voltage and the motor rotation speed realized by the rapid discharge process of FIG. 2.

FIG. 10 is a time chart showing the temporal changes of the residual energy W, the secondary side voltage V2, and the motor rotation speed Nm realized by the above rapid discharge process. In FIG. 10, the time t50 is the time of the collision of the vehicle. The time t51 is the time when the discharge start condition is established. The time t54 is the time of the start of the discharge standby control process. The time t55 is the time of the start of the discharge control process. In addition, the time t56 is the time when the secondary side voltage V2 becomes equal to or less than the target stop voltage V2end due to the discharge control process.

FIG. 10 is different from the example of FIG. 6 in the increase range of the motor rotation speed Nm. More specifically, FIG. 10 shows a case where the motor rotation speed Nm rises during the execution of the idling stop control process, and the induced voltage rises as indicated by the broken line. In addition, unlike the example of FIG. 6, the example of FIG. 10 shows a case where the induced voltage generated by the driving motor M becomes equal to or greater than the voltage of the capacitor 12 and affects the rise of the secondary side voltage V2.

As shown in FIG. 10, when the motor rotation speed Nm rises between the times t52 and t54 during the execution of the idling stop control process, the induced voltage rises as a result and the secondary side voltage V2 also rises at the time t53. Therefore, the time t54 of the end of the idling stop control process is later than the scheduled time. Thus, unlike the example of FIG. 6, in the example of FIG. 10, the secondary side voltage V2 rises due to the induced voltage, and therefore the secondary side voltage V2 at the time t54 when the discharge standby control process starts is greater than that in the example of FIG. 6. Regarding this, the system ECU 8 repeatedly calculates the scheduled discharge standby time Ypre and the scheduled discharge execution time Zpre in accordance with the change of the secondary side voltage V2 while performing the discharge standby control process after the time t54, starts the discharge control process at the time t55 when the discharge standby time T becomes equal to or longer than the scheduled discharge standby time Ypre, and sets the secondary side voltage V2 equal to or less than the target stop voltage V2end at the time t56 when the target discharge time Ttotal elapses. Thus, in the system ECU 8, by repeatedly calculating the scheduled discharge standby time Ypre and the scheduled discharge execution time Zpre in accordance with the change of the secondary side voltage V2 while the discharge standby control process is performed, the execution time Y of the discharge standby control process is adjusted so as to reduce the secondary side voltage V2 to the target stop voltage V2end or less at the time t56 when the target discharge time Ttotal elapses.

Figure 11:
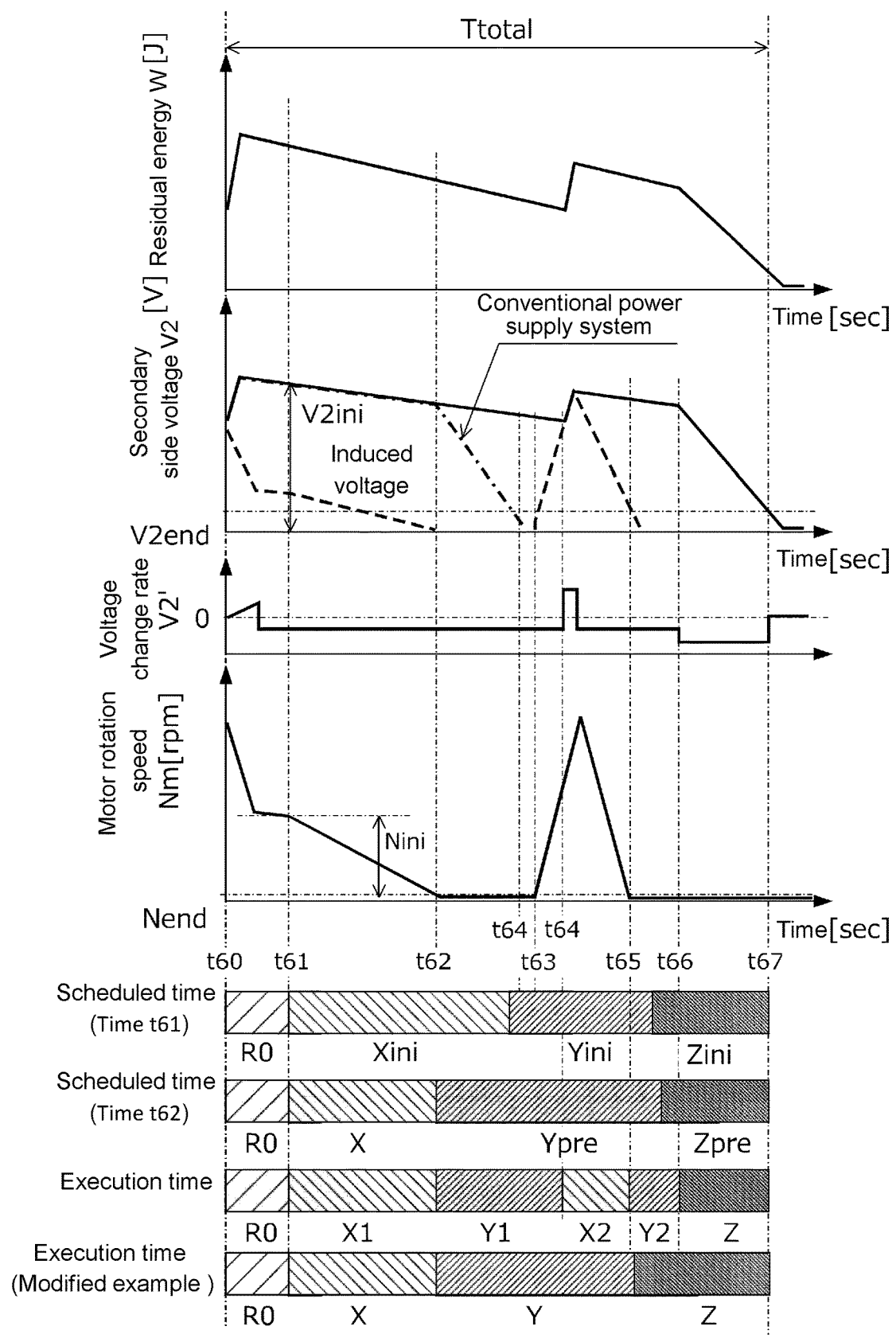
FIG. 11 is a time chart showing temporal changes of the secondary side voltage and the motor rotation speed realized by the rapid discharge process of FIG. 2.

FIG. 11 is a time chart showing the temporal changes of the residual energy W, the secondary side voltage V2, and the motor rotation speed Nm realized by the above rapid discharge process. In FIG. 11, the time t60 is the time of the collision of the vehicle. The time t61 is the time when the discharge start condition is established and the first idling stop control process is started. The time t62 is the time of the start of the first discharge standby control process. The time t64 is the time when the second idling stop control process is started. The time t65 is the time of the start of the second discharge standby control process. The time t66 is the time of the start of the discharge control process. In addition, the time t67 is the time when the secondary side voltage V2 becomes equal to or less than the target stop voltage V2end due to the discharge control process.

FIG. 11 is different from the example of FIG. 10 in the timing at which the motor rotation speed Nm rises. More specifically, FIG. 11 shows a case where the motor rotation speed Nm rises between the times t62 and t64 during the execution of the first discharge standby control process, and the induced voltage rises as indicated by the broken line. Further, the example of FIG. 11 shows a case where the induced voltage generated by the driving motor M is equal to or greater than the voltage of the capacitor 12 and affects the rise of the secondary side voltage V2.

The system ECU 8 repeatedly calculates the scheduled discharge standby time Ypre and the scheduled discharge execution time Zpre in accordance with the change of the secondary side voltage V2 while performing the first discharge standby control process after the time t62. Here, in the example of FIG. 11, the motor rotation speed Nm becomes equal to or greater than the target stop rotation speed Nend at the time t63, and then the voltage change rate V2' of the secondary side voltage V2 becomes positive at the time t64. In response to this, the system ECU 8 ends the first discharge standby control process and starts the second idling stop control process (see S27 in FIG. 5). Thereafter, at the time t65, in response to that the motor rotation speed Nm becomes equal to or less than the target stop rotation speed Nend again, the system ECU 8 ends the second idling stop control process and starts the second discharge standby control process. Thereafter, the system ECU 8 repeatedly calculates the scheduled discharge standby time Ypre and the scheduled discharge execution time Zpre in accordance with the change of the secondary side voltage V2, and starts the discharge control process at the time t66 when the second discharge standby time becomes equal to or longer than the scheduled discharge standby time Ypre. As a result, the secondary side voltage V2 becomes equal to or less than the target stop voltage V2end at the time t67 when the target discharge time Ttotal elapses.

Here, in FIG. 11, the change of the secondary side voltage V2 in the conventional power supply system is indicated by a one-dot chain line. The conventional power supply system refers to a system that starts the discharge control process immediately after the idling stop control process is completed, without executing the discharge standby control process. As shown in FIG. 11, in the conventional power supply system, the discharge control process is immediately started in response to that the motor rotation speed Nm becomes equal to or less than the target stop rotation speed Nend at the time t62. As a result, the secondary side voltage V2 becomes equal to or less than the target stop voltage V2end at the time t64. Therefore, in the conventional power supply system, although the secondary side voltage V2 can be reduced to the target stop voltage V2end or less within the target discharge time Ttotal after a vehicle collision, electric power cannot be supplied from the backup power supply unit 5 to the system ECU 8 after the time t64 when the secondary side voltage V2 becomes equal to or less than the target stop voltage V2end, and therefore, afterward at the time t65, even if the motor rotation speed Nm rises and the secondary side voltage V2 rises again, the discharge control process may not be executed. In contrast thereto, according to the power supply system 1 of the present embodiment, by executing the discharge standby control process for a predetermined time after the idling stop control process is completed, as shown in FIG. 11, the discharge control process can be executed even if the secondary side voltage V2 rises again, and the secondary side voltage V2 can be reduced to the target stop voltage V2end or less within the target discharge time Ttotal.

The present embodiment illustrates a case where the system ECU 8 executes the idling stop control process again when the voltage change rate V2' is greater than 0 and the motor rotation speed Nm is greater than the target stop rotation speed Nend during the execution of the discharge standby control process (see S27 in FIG. 5), but the disclosure is not limited thereto. In this case, the system ECU may continue executing the discharge standby control process even if the voltage change rate V2' is greater than 0 and the motor rotation speed Nm is greater than the target stop rotation speed Nend during the execution of the discharge standby control process. As shown in the bottom part of FIG. 11, even in a modified example that does not perform the idling stop control process again, the secondary side voltage V2 can be reduced to the target stop voltage V2end or less within the target stop time Ttotal.

Second Embodiment

Next, the second embodiment of the disclosure will be described with reference to the drawings. The power supply system of the present embodiment is different from the power supply system 1 of the first embodiment in the procedure of the discharge standby control process.

Figure 12:
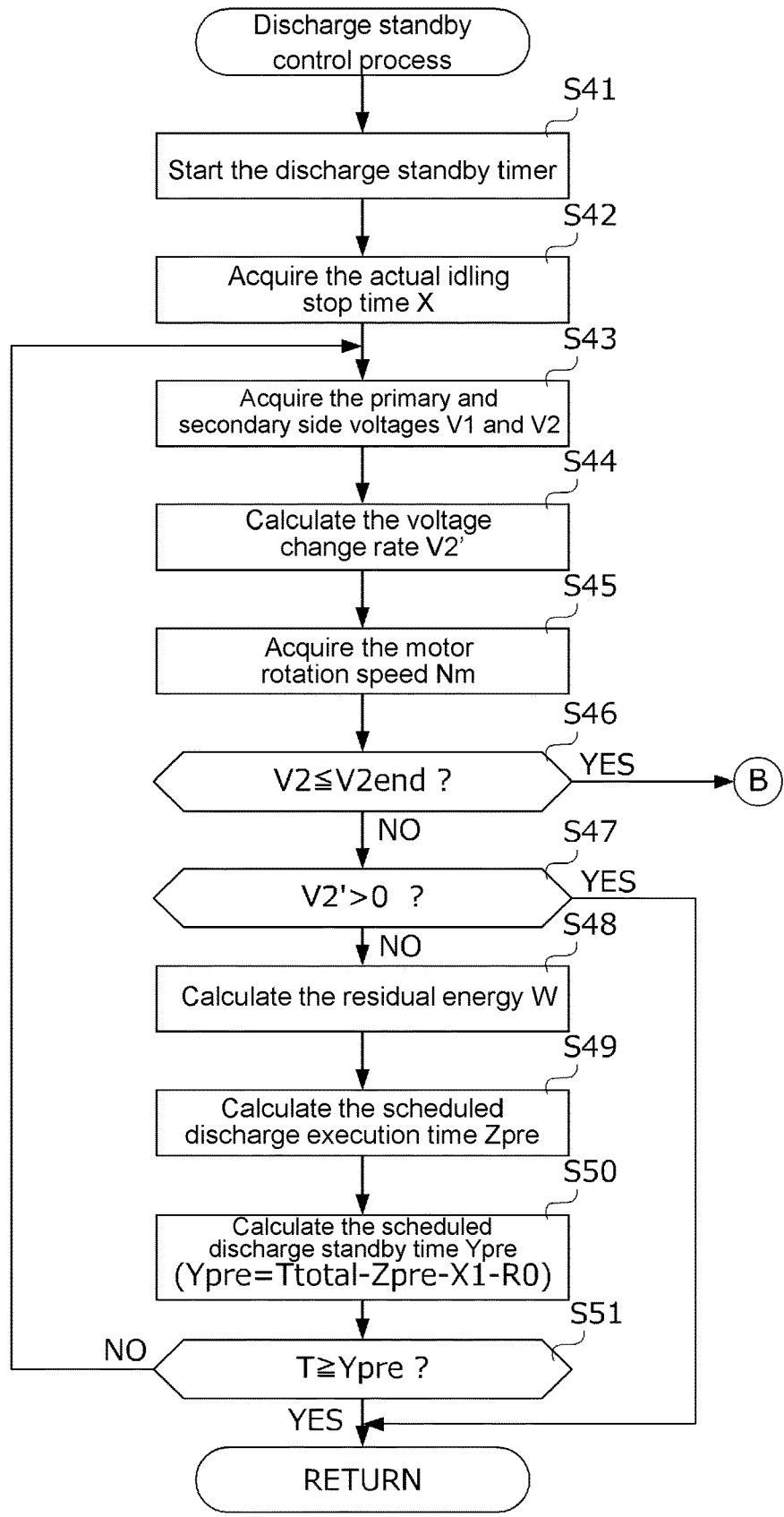
FIG. 12 is a flow chart showing a specific procedure of the discharge standby control process in the power supply system according to the second embodiment of the disclosure.

FIG. 12 is a flow chart showing a specific procedure of the discharge standby control process in the power supply system according to the present embodiment. Since the processing of S41 to S46 and S48 to S51 in the flow chart of FIG. 12 is the same as the processing of S21 to S26 and S28 to S31 in the flow chart of FIG. 5, detailed description is omitted.

In S47, the system ECU determines whether the voltage change rate V2' calculated in S44 is greater than 0. When the determination result of S47 is NO, the system ECU proceeds to S48. When the determination result of S47 is YES, the system ECU immediately ends the discharge standby control process in FIG. 12, and proceeds to S6 in FIG. 2 to start the discharge control process.

As shown in FIG. 6 to FIG. 11, while the idling stop control process and the discharge standby control process are executed, the electric power in the high voltage circuit 2 is consumed by various auxiliary devices including the system ECU. For this reason, the secondary side voltage V2 gradually decreases, and therefore the voltage change rate V2' becomes negative. Thus, in the power supply system of the preset embodiment, when the voltage change rate V2' becomes positive during the execution of the discharge standby control process, the discharge control process is immediately started even before the scheduled discharge standby time Ypre elapses so that the secondary side voltage V2 can be reduced to the target stop voltage V2end or less within the target discharge time Ttotal.

Third Embodiment

Next, the third embodiment of the disclosure will be described with reference to the drawings. The power supply system of the present embodiment is different from the power supply system 1 of the first embodiment in the procedure of the discharge standby control process.

Figure 13:
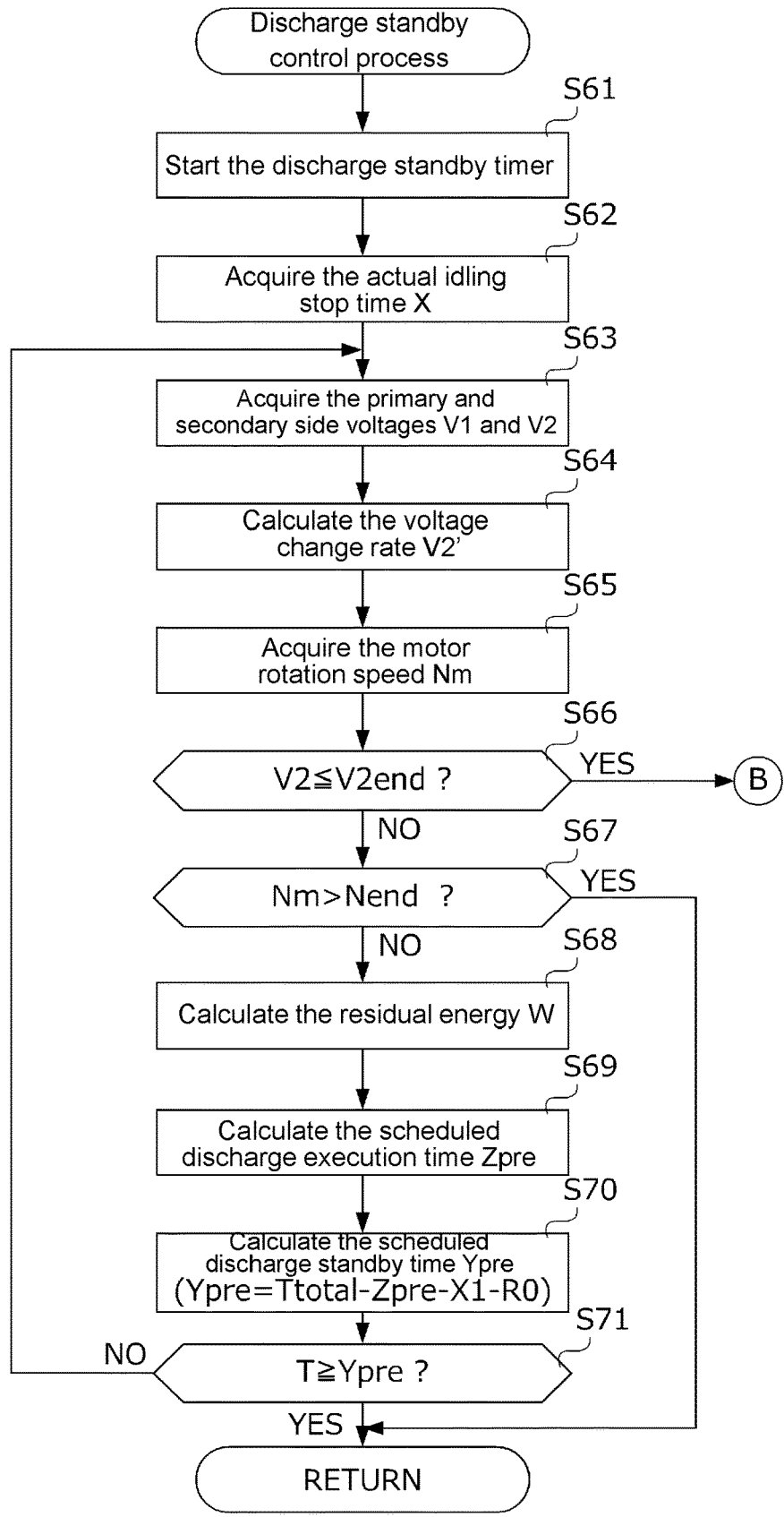
FIG. 13 is a flow chart showing a specific procedure of the discharge standby control process in the power supply system according to the third embodiment of the disclosure.

FIG. 13 is a flow chart showing a specific procedure of the discharge standby control process in the power supply system according to the present embodiment. Since the processing of S61 to S66 and S68 to S71 in the flow chart of FIG. 13 is the same as the processing of S21 to S26 and S28 to S31 in the flow chart of FIG. 5, detailed description is omitted.

In S67, the system ECU determines whether the motor rotation speed Nm acquired in S65 is greater than the target stop rotation speed Nend. When the determination result of S67 is NO, the system ECU proceeds to S68. When the determination result of S67 is YES, the system ECU immediately ends the discharge standby control process in FIG. 13, and proceeds to S6 in FIG. 2 to start the discharge control process.

As shown in FIG. 6 to FIG. 11, basically the motor rotation speed Nm is maintained at or below the target stop rotation speed Nend after the idling stop control process is completed. However, if the vehicle collides on a slope or if the vehicle collides obliquely, the motor rotation speed Nm may exceed the target stop rotation speed Nend during the execution of the discharge standby control process, and as a result, the secondary side voltage V2 may rise. Thus, in the power supply system of the present embodiment, when the motor rotation speed Nm becomes greater than the target stop rotation speed Nend during the execution of the discharge standby control process, the discharge control process is immediately started even before the scheduled discharge standby time Ypre elapses so that the secondary side voltage V2 can be reduced to the target stop voltage V2end or less within the target discharge time Ttotal.

In the embodiment, the control device may determine whether to continue the standby control based on the main circuit voltage acquired by the voltage acquisition part during execution of the standby control.

In the embodiment, the control device may determine whether discharge is possible to reduce the main circuit voltage to a predetermined target voltage (for example, the target stop voltage V2end to be described later) or less within a predetermined target time (for example, the target discharge time Ttotal to be described later) based on the main circuit voltage acquired by the voltage acquisition part during execution of the standby control, and continue the standby control if discharge is possible to reduce to the predetermined target voltage or less, and end the standby control and start the discharge control if discharge is not possible to reduce to the predetermined target voltage or less.

In the embodiment, the control device may repeatedly calculate a scheduled discharge execution time (for example, the scheduled discharge execution time Zpre to be described later) and a scheduled discharge standby time (for example, the scheduled discharge standby time Ypre to be described later) based on the main circuit voltage acquired by the voltage acquisition part during execution of the standby control, and start the discharge control after the scheduled discharge standby time elapses, wherein the scheduled discharge execution time is a time required for reducing the main circuit voltage to the target voltage or less by executing the discharge control, and the scheduled discharge standby time is a time required for standing by for execution of the discharge control in order to reduce the main circuit voltage to the target voltage or less when the target time elapses.

In the embodiment, the control device may calculate residual energy in the main circuit based on the main circuit voltage acquired by the voltage acquisition part during execution of the standby control, and calculate the scheduled discharge time and the scheduled discharge standby time based on the residual energy.

In the embodiment, the control device may determine whether the main circuit voltage rises based on the main circuit voltage acquired by the voltage acquisition part during execution of the standby control, and determine whether to continue the standby control based on a determination result.

In the embodiment, the power supply system may further include a rotation speed acquisition part acquiring a rotation speed of the electric motor, wherein the control device determines whether the rotation speed rises based on the rotation speed acquired by the rotation speed acquisition part during execution of the standby control, and determines whether to continue the standby control based on a determination result.

In the embodiment, the power supply system may further include a power supply device (for example, the backup power supply unit 5 to be described later) supplying electric power in the main circuit to the control device, wherein the control device executes the discharge control using the electric power supplied by the power supply device.

In the embodiment, the control device may not execute the discharge control when the main circuit voltage falls below a predetermined voltage (for example, the target stop voltage V2end to be described later) during execution of the standby control.

(1) In the power supply system of the disclosure, after the discharge start condition is established, the control device executes the standby control for standing by for the start of the discharge control for the predetermined time, and then starts the discharge control for operating the main circuit to reduce the main circuit voltage. In other words, the control device does not immediately start the discharge control in response to the establishment of the discharge start condition, but starts the discharge control after executing the standby control for the predetermined time. Thus, according to the disclosure, after the discharge start condition is established, even if the main circuit voltage rises again while standing by for the execution of the discharge control, the discharge control can be performed to reduce the main circuit voltage to the specified voltage or less within the specified time.

(2) The time required for executing the discharge control varies depending on the main circuit voltage. Therefore, according to the disclosure, by determining whether to continue the standby control based on the main circuit voltage acquired by the voltage acquisition part during the execution of the standby control, the control device can end the standby control and start the discharge control at an appropriate timing according to the main circuit voltage at that time to reduce the main circuit voltage to the specified voltage or less within the specified time while ensuring that the time for executing the standby control is as long as possible in preparation for the re-rise of the main circuit voltage.

(3) In the power supply system of the disclosure, the control device determines whether discharge is possible to reduce the main circuit voltage to the predetermined target voltage or less within the predetermined target time based on the main circuit voltage acquired by the voltage acquisition part during the execution of the standby control, and continues the standby control if discharge is possible to reduce to the predetermined target voltage or less, and ends the standby control and starts the discharge control if discharge is not possible to reduce to the predetermined target voltage or less. Thus, according to the disclosure, by setting the target time and target voltage with a predetermined margin for the specified time and specified voltage, it is possible to end the standby control and start the discharge control at an appropriate timing according to the main circuit voltage at that time to reduce the main circuit voltage to the specified voltage or less within the specified time while ensuring that the time for executing the standby control is as long as possible in preparation for the re-rise of the main circuit voltage.

(4) In the power supply system of the disclosure, the control device repeatedly calculates the scheduled discharge execution time and the scheduled discharge standby time during the execution of the standby control, and starts the discharge control after the scheduled discharge standby time elapses, wherein the scheduled discharge execution time is a time required for reducing the main circuit voltage to the target voltage or less by executing the discharge control, and the scheduled discharge standby time is a time required for standing by for the execution of the discharge control in order to reduce the main circuit voltage to the target voltage or less when the target time elapses. According to the disclosure, by repeatedly calculating the scheduled discharge standby time during the execution of the standby control to reduce the main circuit voltage to the target voltage or less when the target time elapses, it is possible to end the standby control and start the discharge control at an appropriate timing according to the main circuit voltage at that time to reduce the main circuit voltage to the specified voltage or less within the specified time while ensuring that the time for executing the standby control is as long as possible in preparation for the re-rise of the main circuit voltage.

(5) The energy in the main circuit increases as the voltage in the main circuit rises. In addition, the energy in the main circuit increases as the number of capacitors or the capacitance provided in the main circuit and the devices connected to the main circuit increase. Thus, the control device calculates the residual energy in the main circuit based on the main circuit voltage acquired during the execution of the standby control, and calculates the scheduled discharge time and the scheduled discharge standby time based on the residual energy. Accordingly, the scheduled discharge time, the scheduled discharge standby time, and the like can be calculated more accurately in consideration of the number of capacitors or the capacitance provided in the main circuit and the devices connected to the main circuit.

(6) After a vehicle collision, the electric power in the main circuit is consumed by various auxiliary devices. For this reason, the main circuit voltage gradually decreases after a vehicle collision. However, as described above, if induced power is generated in the electric motor for some reason, the main circuit voltage may rise again. Thus, in the power supply system of the disclosure, the control device determines whether the main circuit voltage rises during the execution of the standby control, and determines whether to continue the standby control based on the determination result. Thus, if the main circuit voltage rises during the execution of the standby control, the standby control can be ended and the discharge control can be started in response thereto to reduce the main circuit voltage to the specified voltage or less within the specified time.

(7) As described above, if the electric motor rotates for some reason after a vehicle collision, induced power may be generated and cause the main circuit voltage to rise again. Thus, in the power supply system of the disclosure, the control device determines whether the rotation speed of the electric motor rises during the execution of the standby control, and determines whether to continue the standby control based on the determination result. Thus, if the rotation speed of the electric motor rises during the execution of the standby control and the main circuit voltage may rise, the standby control can be ended and the discharge control can be started in response thereto to reduce the main circuit voltage to the specified voltage or less within the specified time.

(8) When the vehicle collides, the battery may malfunction due to the impact, and the electric power for executing the discharge control may not be supplied from the battery to the control device. Regarding this, the power supply system of the disclosure includes the power supply device that supplies the electric power in the main circuit to the control device, and the control device executes the discharge control using the electric power supplied by the power supply device. Thus, the control device can execute the discharge control with the electric power supplied by the power supply device even if electric power cannot be supplied from the battery to the control device.

However, since the power supply device supplies the electric power in the main circuit to the control device and it requires a large amount of electric power to execute the discharge control in the control device, after the discharge start condition is established, the time that allows the discharge control to be executed in the control device under the electric power supplied from the power supply device is limited. Regarding this, in the disclosure, after the discharge start condition is established, the control device can execute the standby control for standing by for the start of the discharge control for the predetermined time, so as to prolong the time in which electric power can be supplied to the control device by the power supply device.

(9) In the power supply system of the disclosure, the control device does not execute the discharge control if the main circuit voltage falls below the predetermined voltage during the execution of the standby control. Thereby, execution of unnecessary discharge control can be prevented.

Although an embodiment of the disclosure has been described as above, the disclosure is not limited thereto. The detailed configuration may be changed as appropriate within the scope of the disclosure.

For example, the above embodiment illustrates a case where the disclosure is applied to the power supply system 1 in which the high voltage DC-DC converter 22 is provided between the high voltage battery 21 and the first inverter 23. However, the disclosure is not limited thereto. The disclosure can also be applied to a power supply system in which the high voltage battery 21 and the first inverter 23 are connected without going through the high voltage DC-DC converter 22.

Moreover, the above embodiment illustrates a case where the residual energy W in the high voltage circuit 2 is calculated by adding the energy stored in the primary side capacitor 11 and the energy stored in the secondary side capacitor 12 as shown by the above equation (3). However, the disclosure is not limited thereto. For example, when the capacitance C1 of the primary side capacitor 11 is sufficiently small compared to the capacitance C2 of the secondary side capacitor 12, the energy stored in the primary side capacitor 11 may be ignored when calculating the residual energy W.

Further, the above embodiment illustrates a case where the disclosure is applied to a power supply system 1 in which the driving motor M and the first inverter 23 thereof are connected to the second power lines 27p and 27n, and the driving motor and the first inverter thereof are not connected to the first power lines 26p and 26n. However, the disclosure is not limited thereto. The disclosure can also be applied to a power supply system in which the driving motor and the inverter thereof are connected to both the second power lines 27p and 27n and the first power lines 26p and 26n. In this case, since each motor can rotate independently, it is necessary to monitor both the primary side voltage V1 and the secondary side voltage V2 after a vehicle collision. Thus, in this case, in the discharge control process of S6 in FIG. 2, it is preferable to execute the rapid discharge process until the primary side voltage V1 becomes equal to or less than the target stop voltage V1end and the secondary side voltage V2 becomes equal to or less than the target stop voltage V2end. In addition, it is preferable to calculate the voltage change rate V1' of the primary side voltage V1 and the voltage change rate V2' of the secondary side voltage V2 in the process of S24 in FIG. 5, acquire the rotation speeds of both motors in the process of S25, determine whether the primary side voltage V1 is equal to or less than the target stop voltage V1end and the secondary side voltage V2 is equal to or less than the target stop voltage V2end in the process of S26, and determine whether not only the secondary side voltage V2 but also the primary side voltage V1 has risen again in the process of S27.

What is claimed is:

1. A power supply system for a vehicle, comprising:
   a battery;
   an electric motor connected to a driving wheel of the vehicle;
   a main circuit transferring electric power between the battery and the electric motor;
   a voltage sensor acquiring a main circuit voltage which is a voltage in the main circuit; and
   an engine control unit executing standby control after a discharge start condition is established, and starting discharge control for operating the main circuit and reducing the main circuit voltage after executing the standby control,
   wherein the standby control is a process for temporarily standing by for the start of the discharge control after stopping a rotation of the electric motor, and
   wherein the engine control unit determines whether to continue the standby control based on the main circuit voltage acquired by the voltage sensor during execution of the standby control.

2. The power supply system for the vehicle according to claim 1, wherein the engine control unit determines whether discharge is possible to reduce the main circuit voltage to a predetermined target voltage or less within a predetermined target time based on the main circuit voltage acquired by the voltage sensor during execution of the standby control, and continues the standby control if discharge is possible to reduce to the predetermined target voltage or less, and ends the standby control and starts the discharge control if discharge is not possible to reduce to the predetermined target voltage or less.

3. The power supply system for the vehicle according to claim 2, wherein the engine control unit repeatedly calculates a scheduled discharge execution time and a scheduled discharge standby time based on the main circuit voltage acquired by the voltage sensor during execution of the standby control, and starts the discharge control after the scheduled discharge standby time elapses, wherein the scheduled discharge execution time is a time required for reducing the main circuit voltage to the target voltage or less by executing the discharge control, and the scheduled discharge standby time is a time required for standing by for execution of the discharge control in order to reduce the main circuit voltage to the target voltage or less when the target time elapses.

4. The power supply system for the vehicle according to claim 3, wherein the engine control unit calculates residual energy in the main circuit based on the main circuit voltage acquired by the voltage sensor during execution of the standby control, and calculates the scheduled discharge time and the scheduled discharge standby time based on the residual energy.

5. The power supply system for the vehicle according to claim 1, wherein the engine control unit determines whether the main circuit voltage rises based on the main circuit voltage acquired by the voltage sensor during execution of the standby control, and determines whether to continue the standby control based on a determination result.

6. The power supply system for the vehicle according to claim 1, further comprising a resolver acquiring a rotation speed of the electric motor,
   wherein the engine control unit determines whether the rotation speed rises based on the rotation speed acquired by the resolver during execution of the standby control, and determines whether to continue the standby control based on a determination result.

7. The power supply system for the vehicle according to claim 1, further comprising a power supply device supplying electric power in the main circuit to the engine control unit,
   wherein the engine control unit executes the discharge control using the electric power supplied by the power supply device.

8. The power supply system for the vehicle according to claim 1, wherein the engine control unit does not execute the discharge control when the main circuit voltage falls below a predetermined voltage during execution of the standby control.

* * * * *